United States Patent
Yamamoto et al.

(10) Patent No.: US 8,078,812 B2
(45) Date of Patent: *Dec. 13, 2011

(54) INFORMATION TERMINALS SHARING CONTENTS IN A NETWORK, INFORMATION SHARING METHOD AND P2P SYSTEM AND POINT SYSTEM USING THE SAME

(75) Inventors: Takayuki Yamamoto, Yokohama (JP); Shigeto Oeda, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 95 days.

This patent is subject to a terminal disclaimer.

(21) Appl. No.: 12/256,107

(22) Filed: Oct. 22, 2008

(65) Prior Publication Data

US 2009/0132680 A1    May 21, 2009

Related U.S. Application Data

(63) Continuation of application No. 10/929,372, filed on Aug. 31, 2004, now Pat. No. 7,506,125.

(30) Foreign Application Priority Data

Sep. 29, 2003 (JP) .................................. 2003-336689
Feb. 3, 2004 (JP) .................................. 2004-026199

(51) Int. Cl.
  *G06F 13/00* (2006.01)
  *G06F 15/16* (2006.01)
(52) U.S. Cl. ...................... 711/159; 709/218; 709/229
(58) Field of Classification Search .................. None
See application file for complete search history.

(56) References Cited

U.S. PATENT DOCUMENTS

| 4,797,814 | A | 1/1989 | Brenza |
| 5,786,817 | A * | 7/1998 | Sakano et al. ............... 345/619 |
| 6,212,545 | B1 | 4/2001 | Ohtani et al. |
| 6,724,974 | B2 * | 4/2004 | Naruto et al. ............... 386/46 |
| 2001/0002365 | A1 | 5/2001 | Minakuchi et al. |
| 2004/0190476 | A1 | 9/2004 | Bansal et al. |
| 2004/0249871 | A1 | 12/2004 | Bazoon |

FOREIGN PATENT DOCUMENTS

| JP | 11-195048 | 7/1999 |
| JP | 2001-043168 | 2/2001 |
| JP | 2001-223761 | 8/2001 |
| JP | 20220165162 A | 6/2002 |
| JP | 2003-067276 | 3/2003 |
| WO | WO 03/077574 | 9/2003 |

OTHER PUBLICATIONS

English translation of JP02001043168A.

* cited by examiner

*Primary Examiner* — Hetul Patel
(74) *Attorney, Agent, or Firm* — Antonelli, Terry, Stout & Kraus, LLP.

(57) ABSTRACT

Information terminal and information sharing method are provided which consider survival time of contents at a transmission destination and propagate the contents widely so as to be suitable for contents sharing. In the information terminal and information sharing method, contents allotted with survival time is received, the survival time allotted to the contents is changed, contents allotted with the changed survival time is transmitted to a different information terminal, and the contents is deleted after the changed survival time has expired.

30 Claims, 25 Drawing Sheets

FIG. 1
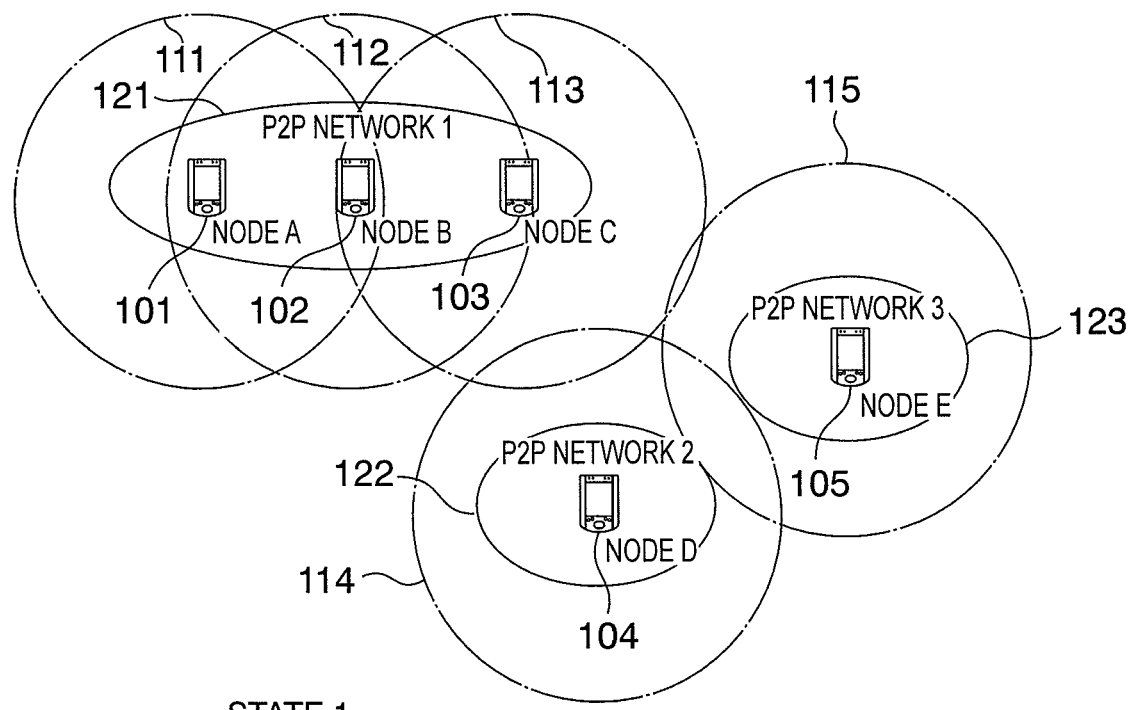
STATE 1
STATE 2
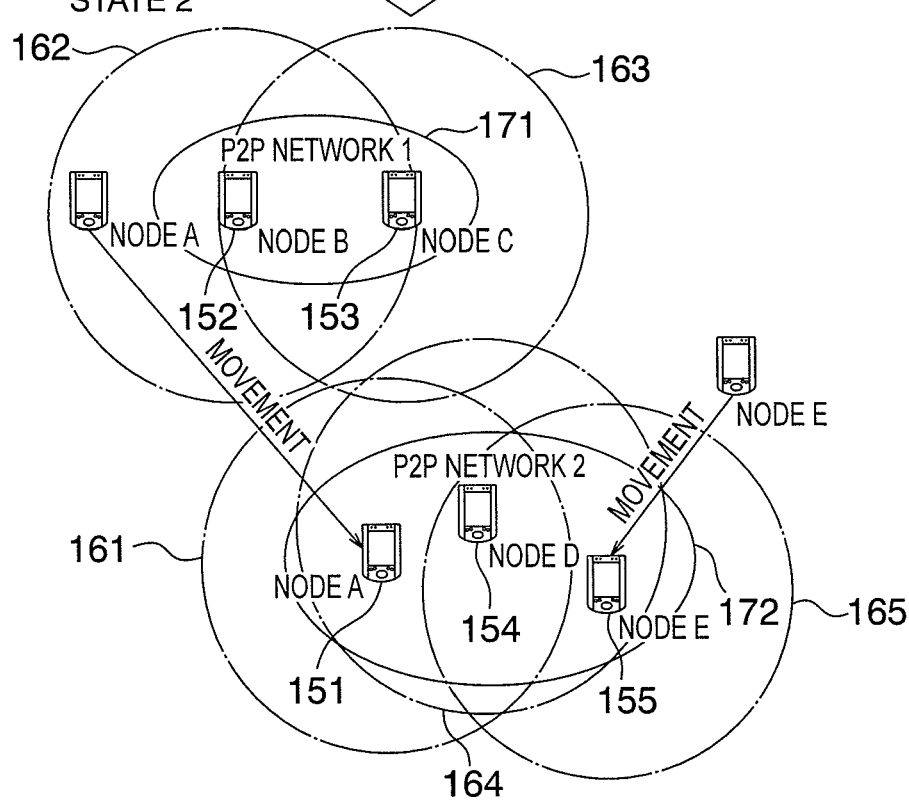

FIG. 3

| METADATA 310 | CONTENTS ID 311 | 02834756234873945334 |
|---|---|---|
| | ISSUER ID 312 | 78984753453459345330 |
| | CONTENTS TYPE 313 | SEE FIG. 12 |
| | CONTENTS ACTION 314 | SEE FIG. 16 |
| | SURVIVAL TIME 315 | TILL 12:20, AUG. 3, 2004 |
| | SURVIVAL TIME UPPER LIMIT 316 | TILL 14:00, AUG. 3, 2004 |
| | FREE AREA 317 | |
| CONTENTS DATA 320 | | NEWS ITEMS AND THE LIKE |

FIG. 5

| | POLICY 501 | LARGE CATEGORY 502 | MEDIUM CATEGORY 503 | SMALL CATEGORY 504 |
|---|---|---|---|---|
| 511 | POSITIVE COLLECTION | SHOPPING | BARGAIN | |
| | | SHOPPING | DISCOUNT | GASOLINE |
| | | GOURMET | REFURBISHED OPENING | |
| 521 | NEGATIVE COLLECTION | SPORTS | TENNIS | |
| | | HOBBY | CAR | |
| | | | COMPUTER | |
| 531 | COLLECTION REFUSAL | ENTERTAINMENT | MUSIC | |
| | | | MOVIE | |

FIG. 6

| LARGE CATEGORY 601 | MEDIUM CATEGORY 602 | SMALL CATEGORY 603 |
|---|---|---|
| SHOPPING | DISCOUNT | GASOLINE |

FIG. 10

| | ACTION OBJECT 1001 | DECISION METHOD 1002 | PROCESS APPLIED TO SURVIVAL TIME 1003 |
|---|---|---|---|
| 1010 TYPE ACTION | POSITIVE COLLECTION | COINCIDENCE OF CATEGORY | LARGE CATEGORY COINCIDENCE:+2 MINUTES<br>MEDIUM CATEGORY COINCIDENCE:+4 MINUTES<br>SMALL CATEGORY COINCIDENCE:+6 MINUTES |
| | NEGATIVE COLLECTION | COINCIDENCE OF CATEGORY | LARGE CATEGORY COINCIDENCE:+1 MINUTE<br>MEDIUM CATEGORY COINCIDENCE:+2 MINUTES<br>SMALL CATEGORY COINCIDENCE:+3 MINUTES |
| | COLLECTION REFUSAL | COINCIDENCE OF CATEGORY | COINCIDENCE OF ONE OR MORE CATEGORIES: -5 MINUTES |
| | OTHER THAN THE ABOVE | | NOTHING PROCESSED |
| 1020 STATE ACTION | MOVING DIRECTION | ALL | 0~30°:d=-1 MINUTE<br>31°~149°:d=0.5 MINUTES<br>150°~210°:d=1.0 MINUTE<br>211°~329°:d=0.5 MINUTES<br>330°~359°:d=-1 MINUTE |
| | MOVING SPEED | ALL | IN CASE OF d≧0<br>0~10km/h:ADDITIONAL TIME=d*10<br>11~30km/h:ADDITIONAL TIME=d*3<br>31km/h:ADDITIONAL TIME=d*1<br>IN CASE OF d<0<br>0~10km/h:ADDITIONAL TIME=d*1<br>11~30km/h:ADDITIONAL TIME=d*3<br>31km/h:ADDITIONAL TIME=d*10 |

| | | |
|---|---|---|
| 1101 | MOVING DIRECTION | 180° |
| 1102 | MOVING SPEED | 40km/h |

1100

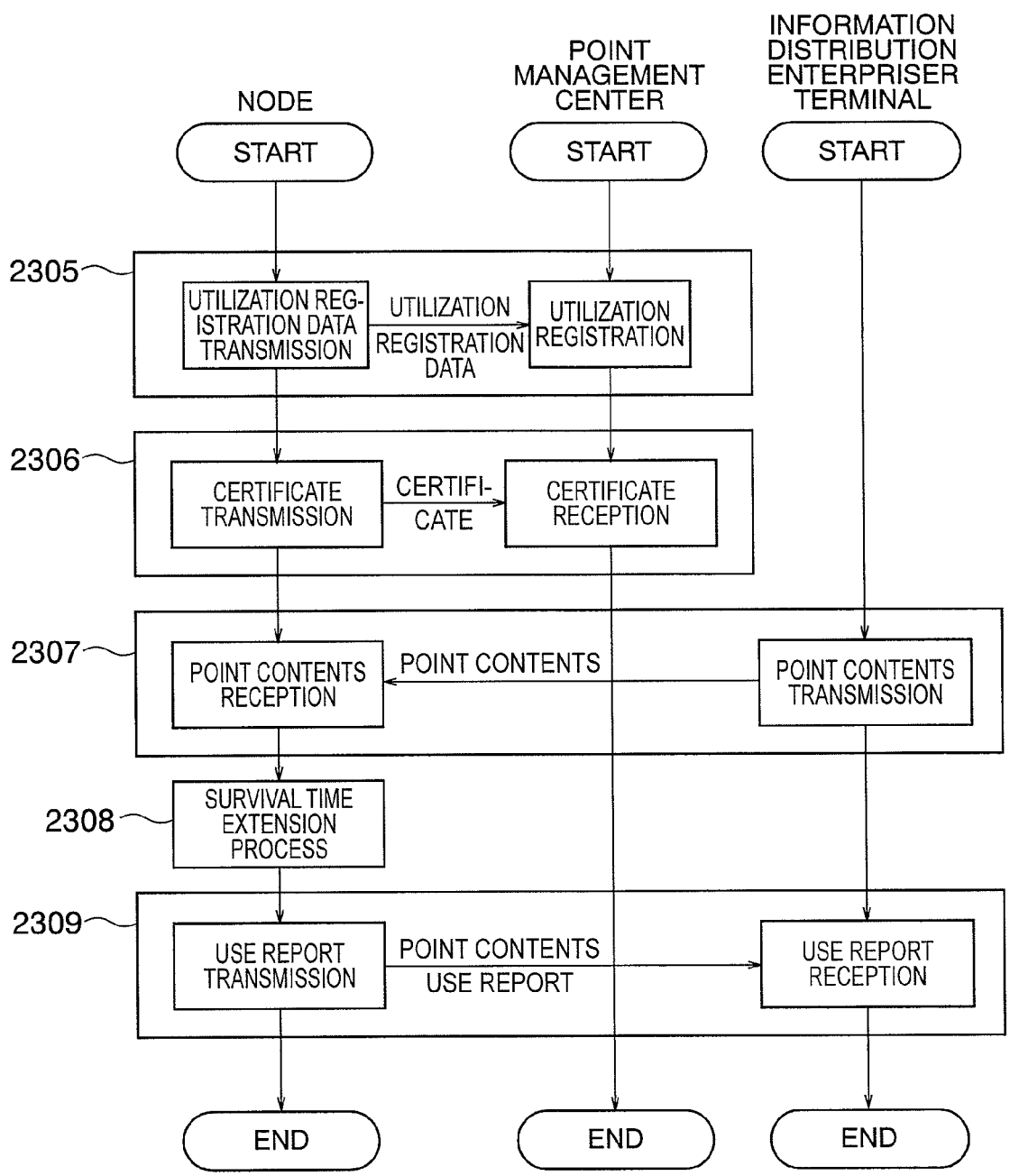

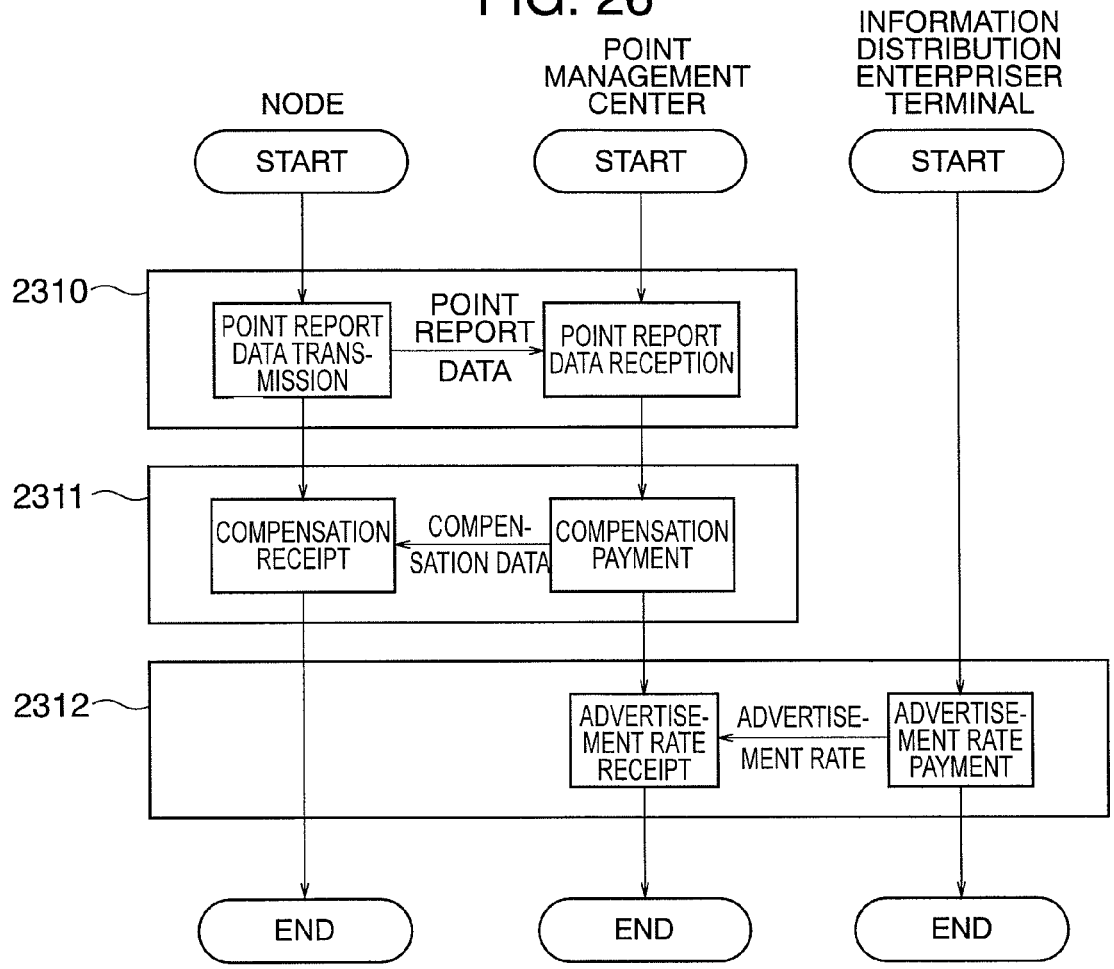

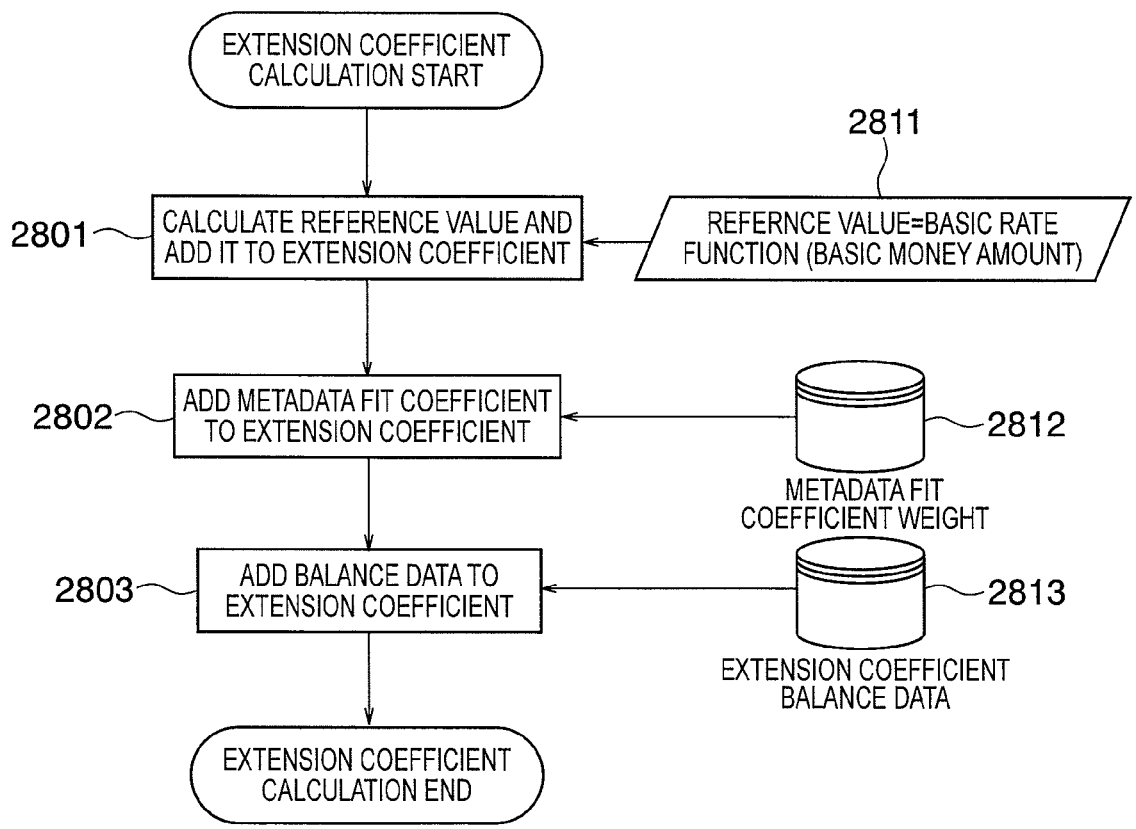

INFORMATION TERMINALS SHARING CONTENTS IN A NETWORK, INFORMATION SHARING METHOD AND P2P SYSTEM AND POINT SYSTEM USING THE SAME

CROSS REFERENCE TO RELATED APPLICATION

This is a continuation of U.S. application Ser. No. 10/929,372, filed Aug. 31, 2004 now U.S. Pat. No. 7,506,125. This application relates to and claims priority from Japanese Patent Application No. 2003-336689, filed on Sep. 29, 2003 and No. 2004-026199, filed on Feb. 3, 2004. The entirety of the contents and subject matter of all of the above is incorporated herein by reference.

BACKGROUND OF THE INVENTION

1. Field of the Invention

The present invention relates to information terminals sharing contents in a network, an information sharing method and a P2P system using the same.

2. Description of the Prior Art

A contents automatic delete apparatus has hitherto been available in which for the purpose of "providing an automatic delete apparatus capable of automatically deleting received contents from a memory unit to make full use of the memory unit", "time to save contents is determined in accordance with the length of a time required for delivery when the contents is delivered and after the contents has come to the save time, the contents is deleted". (See abstract of Patent Document 1 (JP-A-2001-43168))

The contents automatic delete apparatus in the aforementioned Patent Document 1 is, however, concerned with survival time of received contents and never considers a point as to how the survival time of contents at a transmission destination is when the received contents is transmitted to a different apparatus.

SUMMARY OF THE INVENTION

Accordingly, the present invention takes the above point into account and it is an object of the present invention is to provide an information terminal suitable for sharing contents, an information sharing method and a P2P system using the same.

To accomplish the above object, according to the invention, an information terminal, an information sharing method and a P2P system as below are provided.

In the information terminal, information sharing method and P2P system according to the invention, contents allotted with survival time is received, the survival time is changed and the contents allotted with survival time is transmitted to a different information terminal.

With this construction, since the received contents is allotted with survival time, the survival time can be set on the transmission side and contents distribution can be controlled on the contents distribution side. Further, the capability of changing survival time can permit the survival time to be set in conformity with an information terminal to which the survival time belongs. In addition, since the contents allotted with survival time is transmitted to a different information terminal, the contents survival time at a transmission destination can be controlled. Thanks to these advantages, the survival time can be controlled throughout the P2P system and suitability to contents sharing can be assured.

According to the present invention, the information terminal, information sharing method and P2P system suitable for sharing of contents can be provided.

Other objects, features and advantages of the invention will become apparent from the following description of the embodiments of the invention taken in conjunction with the accompanying drawings.

BRIEF DESCRIPTION OF THE DRAWINGS

FIG. 1 is a diagram showing the construction of an ad hoc network.

FIG. 3 is a diagram showing a structure of contents.

FIG. 5 is a diagram showing a structure of a node type.

FIG. 6 is a diagram showing a structure of a contents type.

FIG. 10 is a diagram showing a structure of a contents action.

FIG. 11 is a diagram showing a structure of a node state.

FIG. 25 is a diagram useful in explaining a process, carried out by a node, ranging from preparing for utilization of the system to making a report of use.

FIG. 26 is a diagram useful in explaining a process carried out by the information distribution enterpriser to pay a distribution fee to a point management center on the basis of a point report from a node.

FIG. 27 is a diagram for explaining point contents metadata.

FIG. 28 is a flowchart of calculation of a survival time extension coefficient.

FIG. 29 is a table indicative of survival time extension coefficients.

DESCRIPTION OF THE EMBODIMENTS

Figure 2:
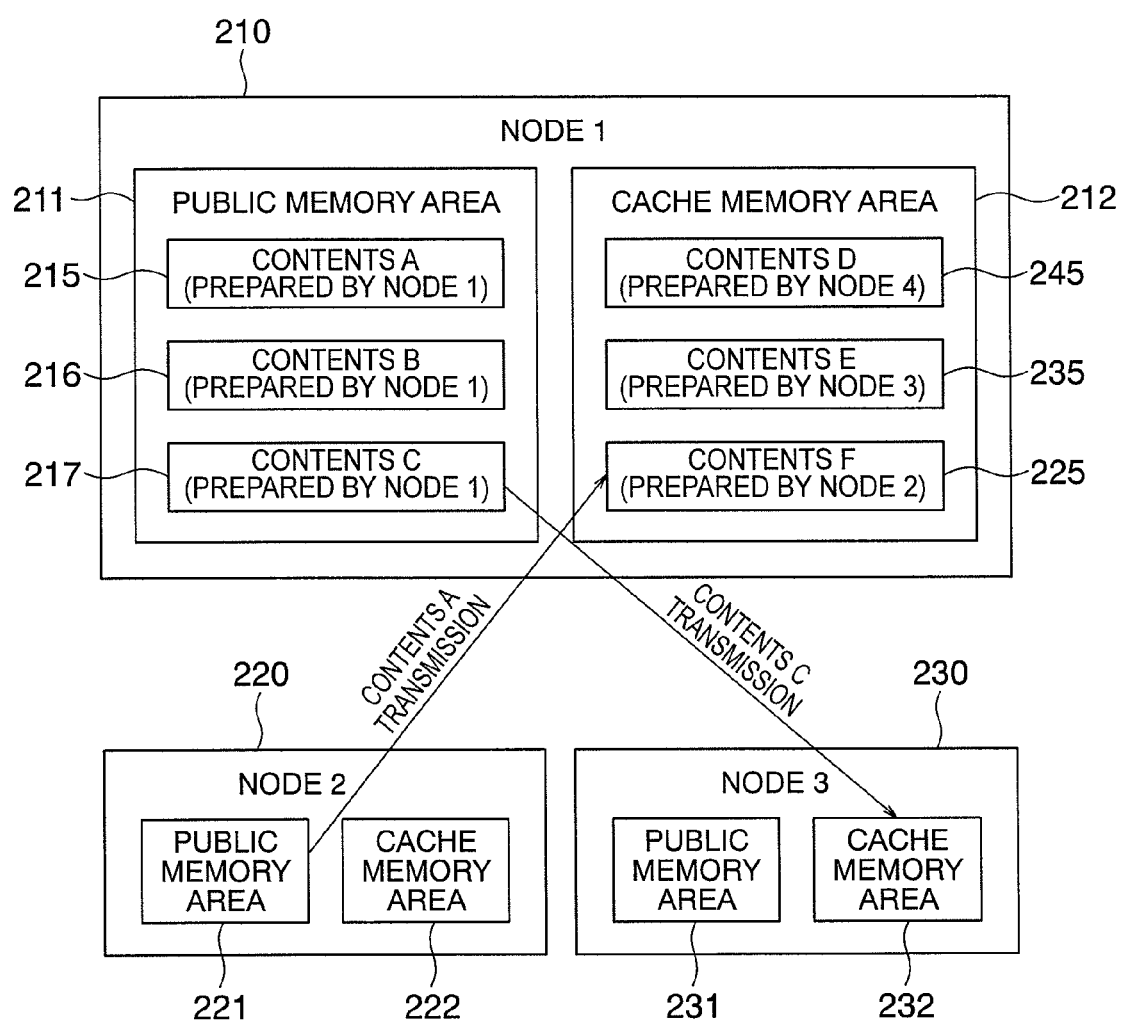
FIG. 2 is a diagram showing a memory structure of a node and transmission/reception of information to/from other nodes.

Embodiments of the invention will now be described with reference to the accompanying drawings. In the present embodiment, an ad hoc network constituting a P2P network will be described hereunder.

The P2P is a contrivance for sharing information with a number of nodes and characteristically, in the P2P, information publicized on a node is searched as it is by a different node. In searching information existing on a node of different person, at least a CPU resource on the searched side must be used. Also, communication takes place voluntarily and therefore a network resource on the searched side is also used. Further, with the information publicized on the node only, the efficiency of searching is very degraded in a large-scale P2P network. When the node is off-line, any information cannot be obtained. Accordingly, a method is contrived, according to which a memory on the node is utilized as a cache memory to improve the efficiency of sharing. The method is proposed from the standpoint of such a mutually aiding idea that instead of providing a slight resource in the P2P, individual participant nodes in the P2P adjust an easy-to-use information sharing environment and this is attributable to a background that the network performance, the CPU performance and the memory mount amount are drastically advanced and as a result a set of surplus resources of the individual nodes surpass a large-scale concentrated server. For example, in order to materialize a Napster with a concentrated server, a huge investment is required whereas through conglomerate of PC partial resources of several tens of millions of PC's, a Napster system can be materialized with only several PC's. In other words, the essence of the P2P resides in that inappreciable amounts of resources are offered to create a comfortable environment. In addition, when the P2P is established by putting away the concentrated server, various kinds of merits unrealizable with the concentrated server can be fruited.

The ad hoc network means a network set up by cooperation of nodes coexisting on that occasion. As the mobile related technology has advanced in recent years, a method for direct communication over a relatively short distance of about several of tens of meters has begun to be highlighted as a communication method of high speed/low cost and high degree of freedom.

FIG. 1 is useful in explaining a dynamic network in an ad hoc network and this dynamic network forms a P2P network. The P2P network includes nodes which can share information on the basis of a function to transmit information and a function to search information. In the description, a direct communication area implies an area in which communication is possible on the basis of short-distance radio communication such as for example wireless LAN (Local Area Network) or infrared-ray communication, whereby when a different node is contained in the direct communication area, information can be transmitted to the different node. In other words, when one node and another are contained in the direct communication area, bi-directional communication can be carried out therebetween. The direct communication area is a conceptually indicated area and it need not always reflect an area within which a radio wave is reachable.

In FIG. 1, constituents 101 to 105, 111 to 115 and 121 to 123 belong to state 1 and constituents 151 to 155, 161 to 165 and 171 to 172 belong to state 2. The state 1 prevails at an hour and the state 2 prevails after a time has elapsed from the state 1. Especially, the constituents 101 to 105 and 151 to 155 are nodes and the constituents 111 to 115 and 161 to 165 are direct communication areas. In the state 1, the directly communicatory areas 111 and 112 of nodes 101 and 102 mutually include counterparts which are mutually communicatory. Similarly, the nodes 102 and 103 are mutually communicatory. Accordingly, the nodes 101, 102 and 103 form a P2P network 1 121. The node 104 and 105 do not include any counterparts in the mutual direct communicatory areas and they cannot communicate with each other. Thus, the node 104 and 105 solely form P2P networks 2 122 and 3 123, respectively.

Next, the state 2 prevailing when a certain time has elapsed from the state 1 will be described. In the state 2, the nodes 101 and 105 have moved to locations where they impersonate nodes 151 and 155, respectively. In the state 2, the node 101 forming the P2P network 121 gets away from the direct communication area, so that the P2P network 121 is reconstructed as a new P2P network 171. Similarly, the node 151, 154 and 155 join in a direct communication area so as to newly reconstruct a P2P network 172. It is to be noted that in reconstructing a P2P network, a process for withdrawing/joining members of the P2P network is carried out.

Figure 21:
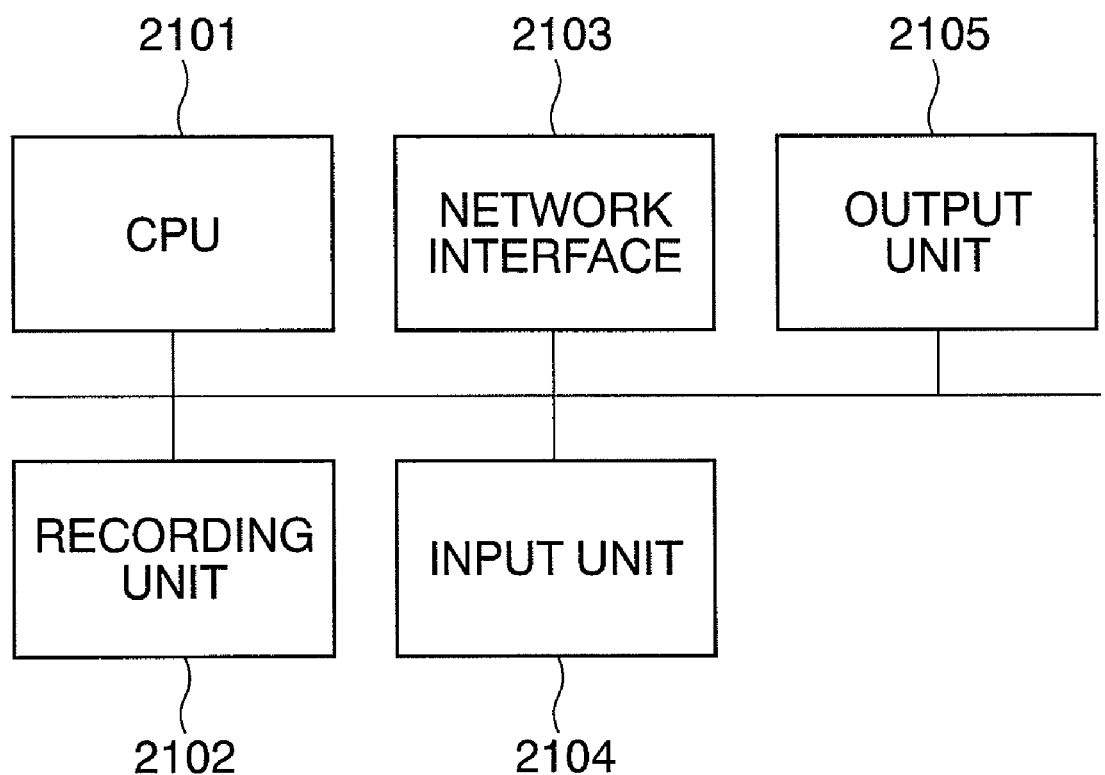
FIG. 21 is a block diagram useful to explain a node (information terminal).

Turning now to FIG. 21, the node will be explained. In FIG. 21, reference numeral 2101 designates a CPU, 2102 a recording unit such as a memory or hard disk, 2103 an interface for connection to a network or for direct connection to a different node, 2104 an input unit such as a keyboard or touch panel and 2105 an output unit as materialized with a screen or loudspeaker. Alternatively, the input unit 2104 may be connected with a module capable of acquiring traveling direction or latitude/longitude of the node.

The recording unit 2102 of the node has an internal structure as shown in FIG. 2. FIG. 2 is useful in explaining a memory structure of node.

Denoted by 210, 220 and 230 are nodes. The node has a public memory area 211 and a cache memory area 212. The public memory area is an area for registering and publicizing contents prepared by the node. Unless special setting is done, a different node can acquire contents registered in the public memory area. The cache memory area is an area for saving contents prepared by a different node. Unless special setting is done, the different node can acquire contents saved in the cache memory area. In FIG. 2, the node 210 lays contents 215 to contents 217 open to public. For example, when the node 230 acquires the contents 217, it saves this contents in a cache memory area 232. When the node 220 transmits contents to the node 210, the transmitted contents is saved in the cache memory area 212. In other words, the public memory area is an area for saving original contents and the cache memory area is an area for saving replicated contents. In an alternative structure, original contents may not be saved in the public memory area or the public memory area may be omitted and in such a case, the node cooperates with a different node to package a similar function but this is conceptually similar to FIG. 2.

Here, contents must be able to be referred or consulted by a possessor of the contents and besides needs to be consulted efficiently by many nodes. The former condition is packaged as existence guarantee and the latter condition is packaged as sharing efficiency. The existence guarantee may be held in a node used by a holder of contents so as to be able to be referred by the holder. The sharing efficiency is not only packaged to a node used by a holder of contents but also copied widely by other nodes so as to improve the efficiency of sharing in the P2P network. The existence guarantee and sharing efficiency interfere with each other in using the memory as viewed from one terminal and are difficult to be compatible with each other when the use amount of memory is limited. Then, the memory is divided into two sections for existence guarantee and sharing efficiency and either one of the sections is clarified when contents is registered on the memory, thereby attaining an advantage that management in each section can be facilitated. In the present embodiment, the section for existence guarantee is called a public memory and the section for sharing efficiency is called a cache memory.

FIG. 3 is for explaining contents. Contents is composed of metadata 310 and contents data 320. The metadata 310 is descriptive of the contents. Contents ID 311 is an ID for definitely discriminating or identifying the contents in all P2P networks. Like the contents ID, issuer ID is an ID for identifying an issuer of the contents. Contents type 313 indicates the kind of contents, for example, news or sports. Contents action 314 is one of data characteristic of the present embodiment and indicates a process applied to survival time. Details of the contents action will be described later. Survival time 315 represents a time for which the contents is not deleted and indicated in terms of a date and hour such as second, minute, hour, day, month and year or a time such as a remainder of 5 minutes. Contents having passed through the survival time is deleted from the memory by the node holding the contents. Deletion from the memory implies not only erase of the contents but also placing the contents in reproduction disabling condition. Survival time upper limit 316 is one of data characteristic of the present embodiment and represents an upper limit time in resettling the survival time. The survival time upper limit will be detailed later. Free area 317 is an area not categorized in the above areas 311 to 316.

The survival time may be set in terms of an hour at which contents is scheduled to be extinguished or may be set in terms of a time for which the contents can survive after being received by the node. If the survival time is set in terms of the hour, then, when contents action 804 to be described later is carried out and contents written in cache 820 is transmitted to a different node, the contents can advantageously be transmitted as it is without reflecting a lapse time after reception upon the contents. With the survival time set in terms of the time, correct operation can advantageously be assured even when the clock of the node is incorrect.

Contents has contents data 320. The contents data represents entity of the contents and in case of press news, for instance, represents a news item. Characteristically of the present embodiment, the contents has an access control attribute to inhibit metadata 311, 312, 313, 314 and 316 other than the survival time 315 and free 317 from being written. In this case, falsification of the contents can be prevented.

Figure 4:
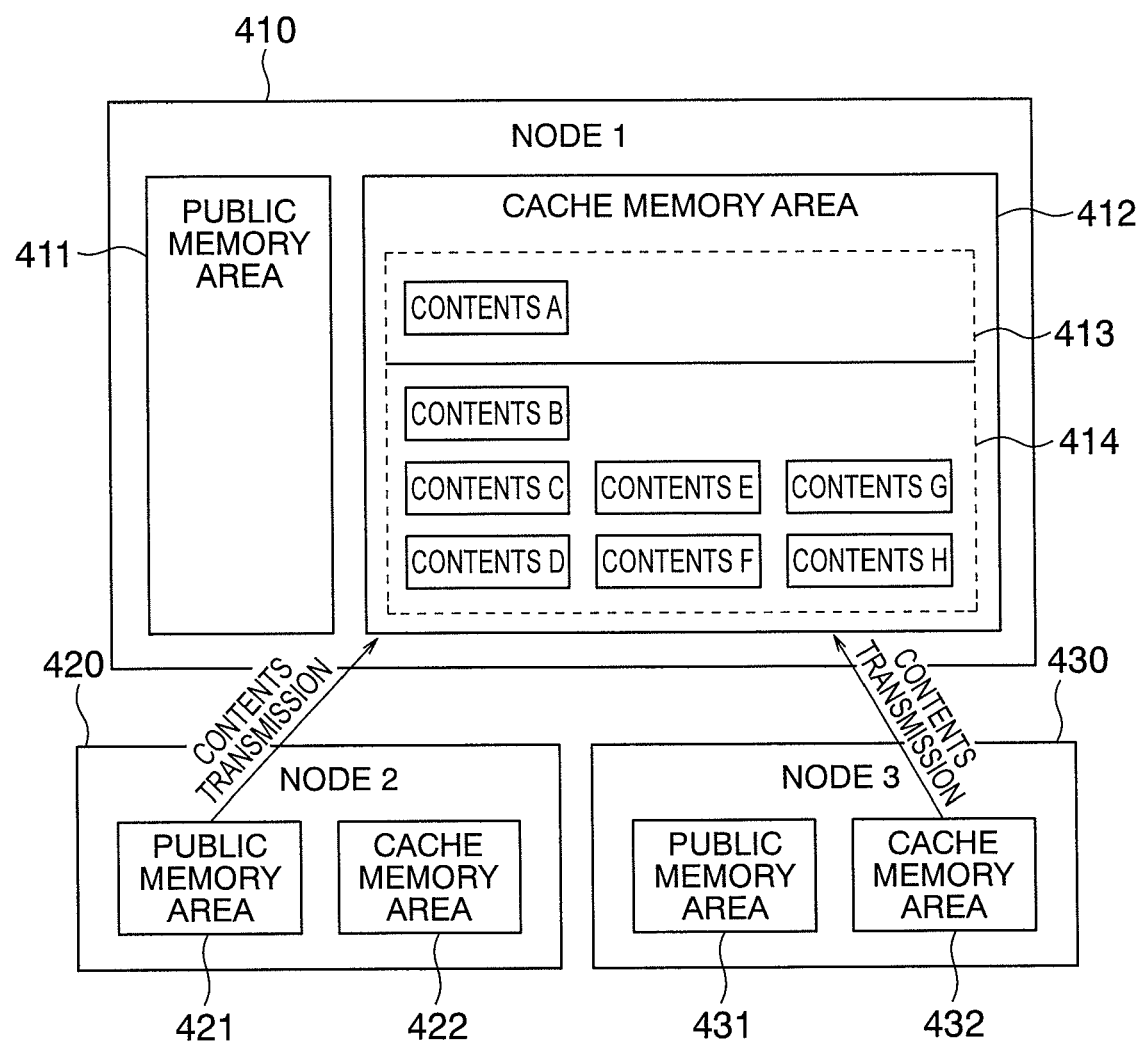
FIG. 4 is a diagram showing the interior of the memory when a search is made to all connectable nodes.

FIG. 4 shows received and collected contents and choice of the contents. Reference numeral 410 designates a request source node and 420 and 430 request target nodes. In FIG. 4, the node 410 makes a request for contents and searches contents conforming to the request whereas the nodes 420 and 430 transmit the contents of interest to the node 410. A result of search including the contents is transmitted from public memory areas 421 and 431 and cache memory areas 422 and 432. The received search result is saved in a cache memory area 412 of the node 410.

In case the data capacity of contents is in excess of the cache memory area, unnecessary contents must be discarded. Denoted by 413 is an area for holding necessary contents and by 414 is an area for holding unnecessary contents. When the kind of contents is ordinary and the node does not have a strong bias toward collection, most of contents are unnecessary contents and only a part constitutes necessary contents. In other words, as the time elapses, contents conforming to setting by the node cumulate. On the other hand, in the area 414, exchange of contents proceeds constantly, starting from a time point that the cache overflows. Namely, the contents held by the node consists of contents strongly depending on tastes of a search source node and contents not deleted by accident to remain.

This is of an essential problem and necessary contents cannot be offered by prediction to an unknown node. Then, such a limitation as to minimize the survival time of contents is added. With the survival time of contents minimized, the cache relatively hardly overflows. Especially in the ad hoc environment, however, by the reason of the short survival time, it is difficult to expect that contents will be carried throughout a wide area by mutual cooperation of nodes. Accordingly, a solution to this problem based on the present invention will be described with reference to FIGS. 5 to 11.

Contents collection setting by a node will first be explained by making reference to FIG. 5. Setting is divided into items of policy 501, that is, positive collection 511, negative collection 521 and collection refusal 531 under the sorting of large category 502, medium category 503 and small category 504. The positive collection is set to positively collect contents for which the degree of tastes is high. In the negative collection, contents is not collected positively but when contents subject to the negative collection is received, the received contents is saved on the cache memory area as long a period as possible. The collection refusal is for setting the survival time to a considerably reduced value when contents a user does not want to collect is collected. The user collecting the contents by way of a node thinks about disposal of the contents immediately after reception but in the ad hoc network, the disposal immediately after reception prevents the contents from being propagated to a wide area. Then, the survival time is reduced to a great extent to disable contents from surviving excessively long in the node of the user not wanting to collect the contents and enable the contents to have an opportunity of being propagated to a different node. The contents is sorted in terms of the large class sorting, medium class sorting and small class sorting and fineness of sorting is promoted sequentially toward the small class sorting from the large class sorting through the medium class sorting. In the present example, when contents corresponding to positive collection is received, it is saved in a non-discard area of the cache memory area. Alternatively, an explicit request may be made to a different node for searching the contents. When contents corresponding to negative collection is received, it is saved in an area of cache memory area for letting the contents be relatively hardly discarded. Contents corresponding to collection refusal is saved in an area of cache memory area for letting the contents be relatively easily discarded.

Referring to FIG. 6, the contents type 313 used in contents collection setting will be described. Like the contents collection setting, the contents type is categorized by large class sorting 601, medium class sorting 602 and small class sorting 603 in connection with taste data. In this example, it will be seen that shopping is included in the large class sorting, discount is included in the medium class sorting and gasoline is included in the small class sorting. In searching, the node may use the large class sorting only and in that case, comparison is made in connection with only the large class sorting of the contents type.

Figure 7:
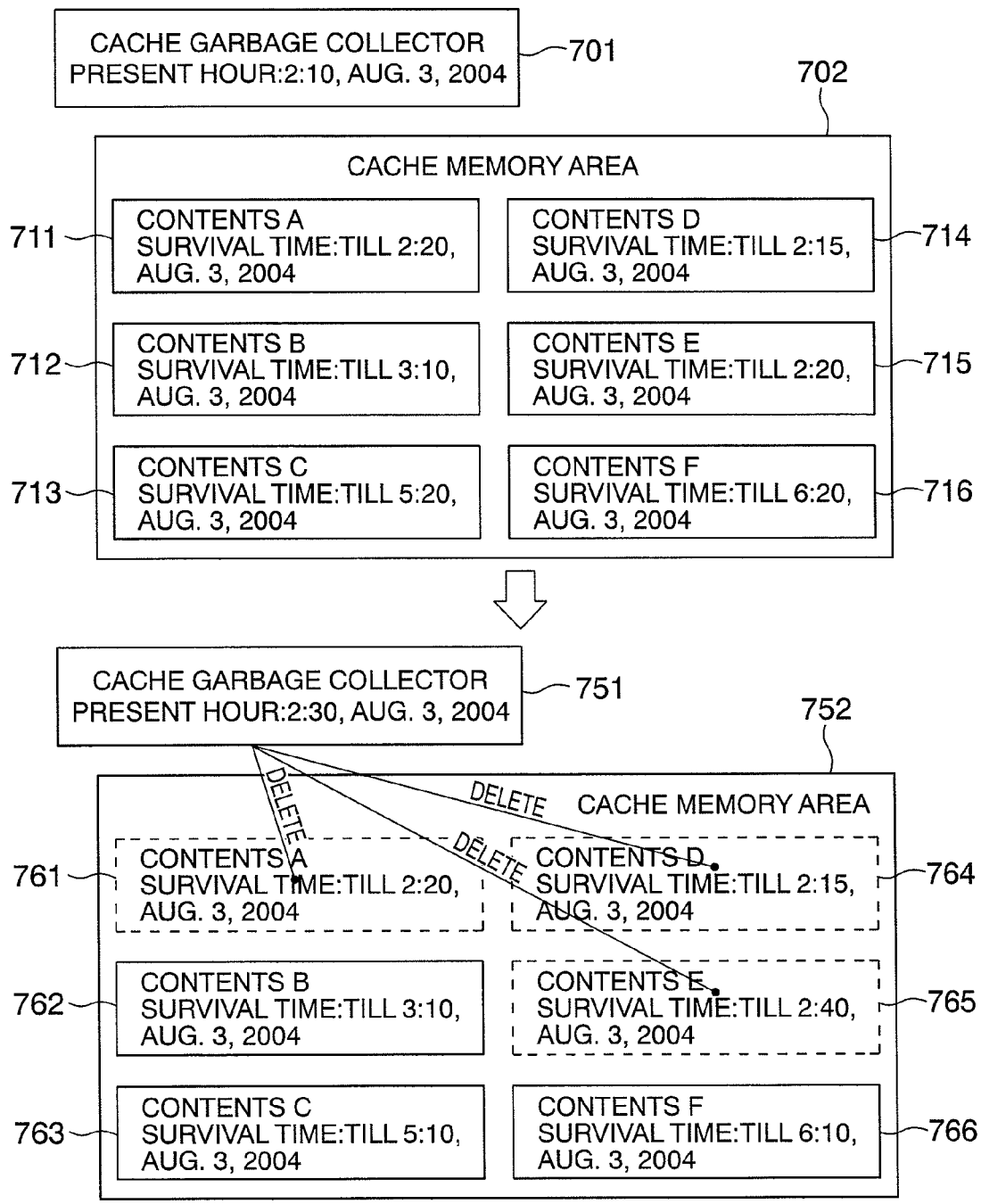
FIG. 7 is a diagram for explaining a cache garbage collector for deleting contents having its survival time expired.

Turning now to FIG. 7, a cache garbage collector for automatically discarding contents at the termination of survival time 315 will be described. The cache garbage collector has a management function attached to the cache memory area.

In FIG. 7, the cache garbage collector designated by 701 and the cache memory area designated by 702 and having contents 711 to contents 716 are placed in state 1 and the cache garbage collector designated by 751 and the cache memory area designated by 752 and having contents 761 to contents 766 are placed in state 2. In the present example, the state 2 prevails after 20 minutes have passed from the state 1. In the state 1, survival times of contents 711 to contents 716 are all after the present time of the cache garbage collector 701 and therefore they are not deleted. In the state 2, however, survival times of contents 761, 764 and 765 are before the present time of the cache garbage collector 751 so as to be past the present time and therefore, they are to be discarded and the cache garbage 751 deletes the contents 761, 764 and 765.

Figure 8:
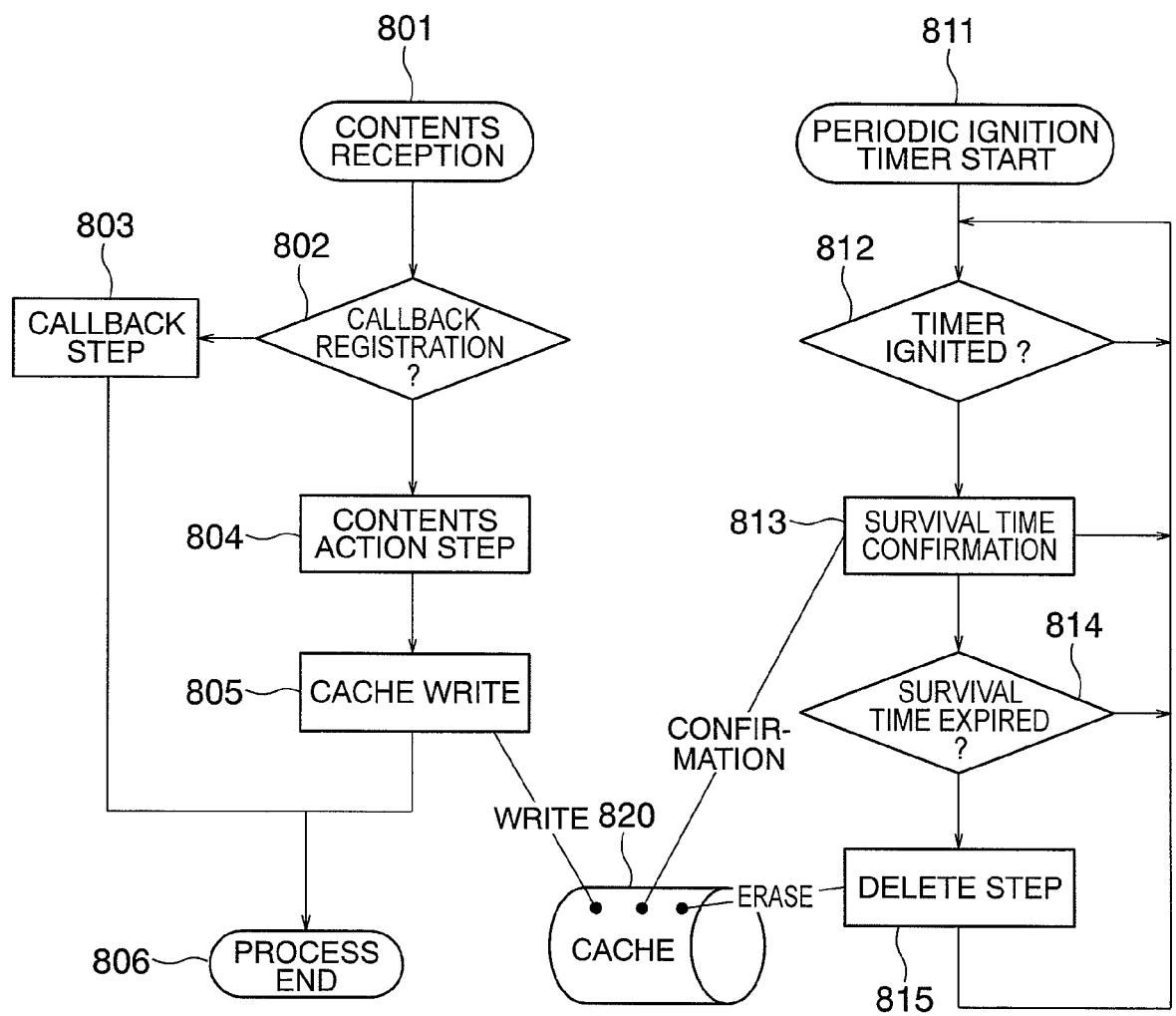
FIG. 8 is a diagram for explaining an embodiment of the invention.

A process for contents reception and a periodic process to be done by a node packaging the process as above will be described by making reference to FIG. 8. Steps 801 to 806 show the flow of a series of contents reception process steps. Steps 811 to 815 show the flow of a series of periodic process steps carried out by the cache garbage collector. When receiving contents (801), the node confirms the presence or absence of registration of a callback (802). The registration of a callback is for registering, in advance, a process to be executed when a condition is met. In this example, contents reception may be a condition for making the step 802 valid or a specified contents type or issuer ID may be a condition for making the step 802 valid. When the condition for the step 802 is met, the corresponding callback step is conducted (803) and the process ends (806). In case no callback step is conducted, the node carries out a contents action step (804). It will be appreciated that the callback registration step is not indispensable but by doing this registration step, processes conforming to a specified contents type and an issuer ID can be set separately to advantage. The contents action step will be detailed later. Next, the contents is written in a cache memory area 820 (805) and the process ends (806). In parallel therewith, a timer ignitable periodically is initiated (811). The process 811 is carried out at the time that the node is started and hence normally processed earlier than the process 801. The timer is started and as a setting time of the timer passes, the timer is ignited (812). Subsequently, survival times 315 of all contents in the cache 820 are confirmed (813) and contents having its survival time expired (814) is deleted from the cache (815). The steps 813 to 815 repeat themselves by the number of contents.

The contents written in the cache 820 can be retransmitted to a different node in response to a transmission request from the different node or one-sidedly. In case the survival time is set in terms of a time, an elapsed time must be subtracted from the survival time when the contents is transmitted to the different node. But if the survival time is set in terms of a time and besides reflection of an elapsed time in not fulfilled, then the survival time remaining intact may be transmitted to the different node.

Figure 9:
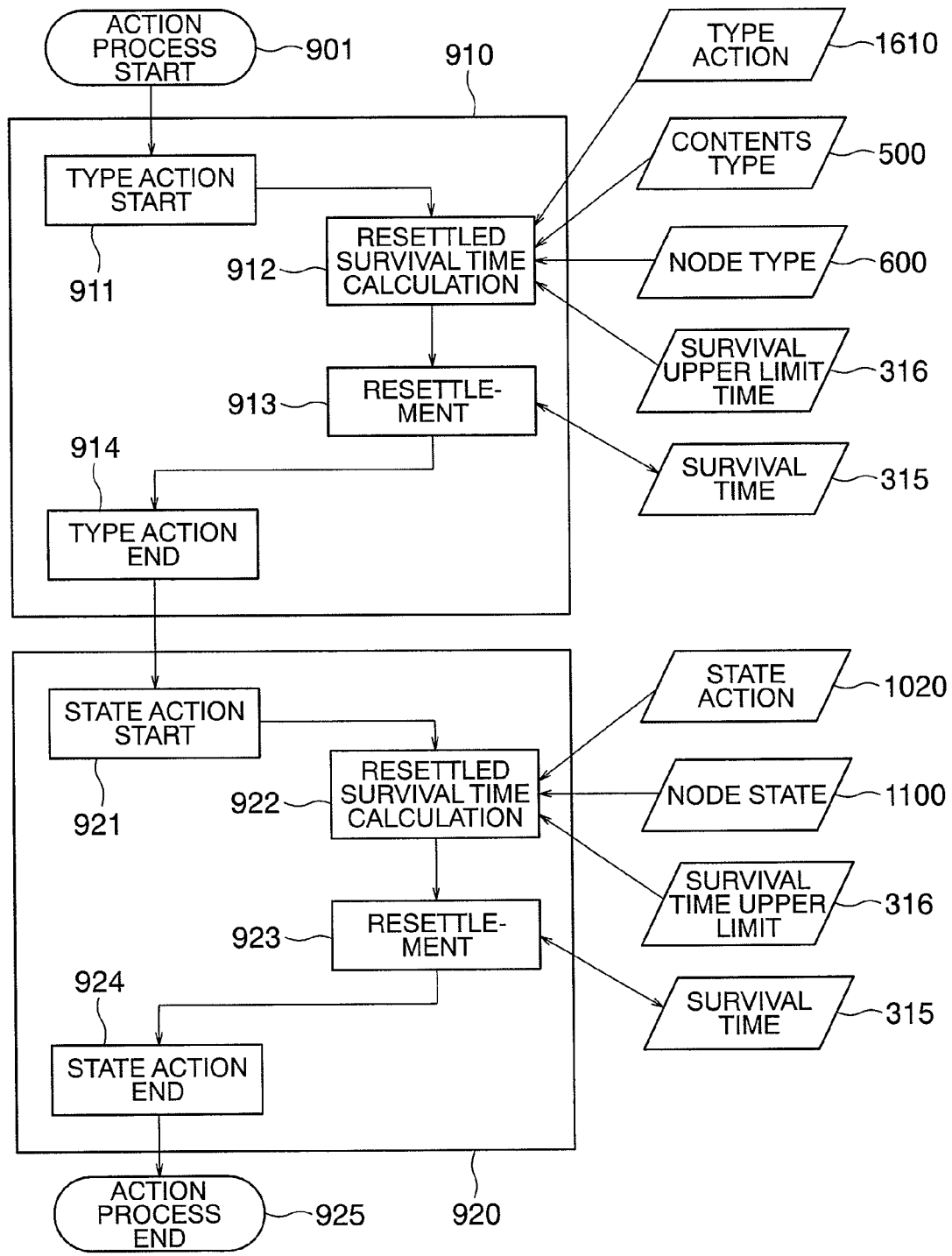
FIG. 9 is a flowchart of execution of a contents action.

Referring now to FIGS. 9 to 11, a description will be given of the contents action 804. The contents action is composed of type action 910 and state action 920. When a contents action is started (901), the type action 910 is first initiated (911). In the type action, a survival time is calculated using a type action 1010 described in the contents action 314 (912). The calculation is carried out in respect of each action object 1001. Decision method 1002 is for deciding whether sorting of contents type 500 coincides with sorting of node type 600 and when coincidence is concluded, process 1003 applied to survival time 1003 is executed. For example, when the contents type coincides, in sorting, with the positive collection of the node type, 2 minutes in case of coincidence in large class sorting, 4 minutes in case of coincidence in middle class sorting and 6 minutes in case of coincidence in small class sorting are added to the survival time. Where the negative collection is concerned, 1 minute for coincidence in large class sorting, 2 minutes for coincidence in middle class sorting and 3 minutes for coincidence in small class sorting are added to the survival time. Where the refusal is concerned, the survival time is reduced drastically by, for example, −5 minutes. In other cases, the survival time remains unchanged. In case the survival time is later than the survival time upper limit 316, it is set to the survival time upper limit. Subsequently, the thus determined survival time is set to survival time 315 of contents (913) and the type action process ends (914).

Thereafter, a state action is initiated (921). In the state action, survival time is calculated in respect of individual items of action objects 1101 and 1102 of node state 1100 (922). Since the received contents is allotted with a node state indicative of a state of terminal such as moving direction and moving speed, a node state of the node is detected and the survival time is changed on the basis of the detected node state. In the present example, because of the moving direction 1101 being 180°, d=1.0 is determined and because of the moving speed 1102 being 40 km/h, an adding time of 10 minutes is determined. Accordingly, the survival time is added with 10 minutes. The thus calculated survival time is resettled in survival time 315 (923) and state action process ends (924). Through the above, all steps are completed (925).

The reason of provision of the survival time upper limit will be described hereunder. In case the survival time is extended each time that copy is made between nodes, there arises a problem that the contents survives unnecessarily long. More particularly, when, in an instance where the survival time of contents is set to 10 minutes and added with 1 minute upon reception of the contents, the contents propagates through 100 nodes in sequence within 10 minutes, the rest of the survival time amounting up to 90 minutes results, so that in an advertisement of time service of 20-minute available period, for example, a conflict with an intention of the contents planner sometimes arises. Then, with an upper limit of survival time provided, the intention of the contents planner can be reflected properly. The upper limit of survival time may be set in terms of hour.

In the foregoing, when action object does not correspond to any of positive collection, negative collection and collection refusal, the process applied to survival time is not carried out but this is not limitative and the survival time may not be so reduced as in the case of the collection refusal, amounting to −1 minute, for example. In this manner, contents of low importance can be deleted earlier to promote the efficient use of the memory capacity.

In FIG. 9, both the type action and the state action are executed but only one of the action steps may be adopted. With only one action set, a more simplified system can be constructed.

Characteristically, the system using the contents action as above has an advantage that the contents has a short survival time to have difficulties in occupying the public cache memory, passes by a node not requiring the contents and facilitates its transmission to a node requiring the contents.

A first embodiment using the present system will be described. The first embodiment is with an intention that in the ad hoc network, a distribution source offers an advertisement to transmit it to a node which is highly interested in the contents.

Figure 12:
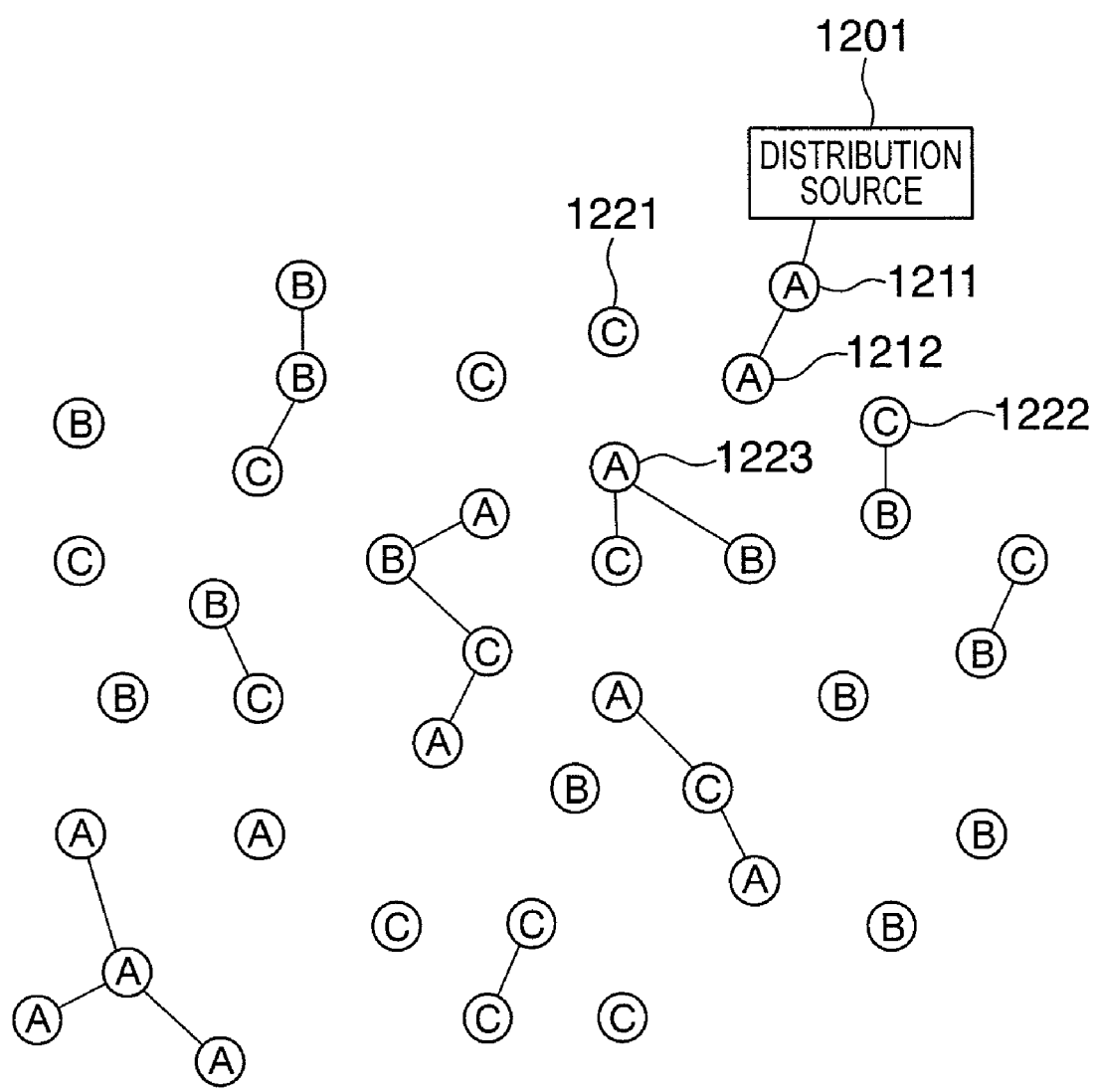
FIG. 12 is a diagram showing a configuration of a first embodiment in the ad hoc network.

Referring to FIG. 12, there is illustrated a configuration of an ad hoc network in which individual nodes move. Each node periodically searches information and therefore advertising contents publicized by a distribution source 1201 propagates to nodes 1211 and 1212. But the information does not propagate to nodes 1221 to 1223 which are not connected to the source by a network. In FIG. 12, the degree of showing interest in the advertising contents of this example decreases sequentially toward C type from A type through B type.

Figure 13:
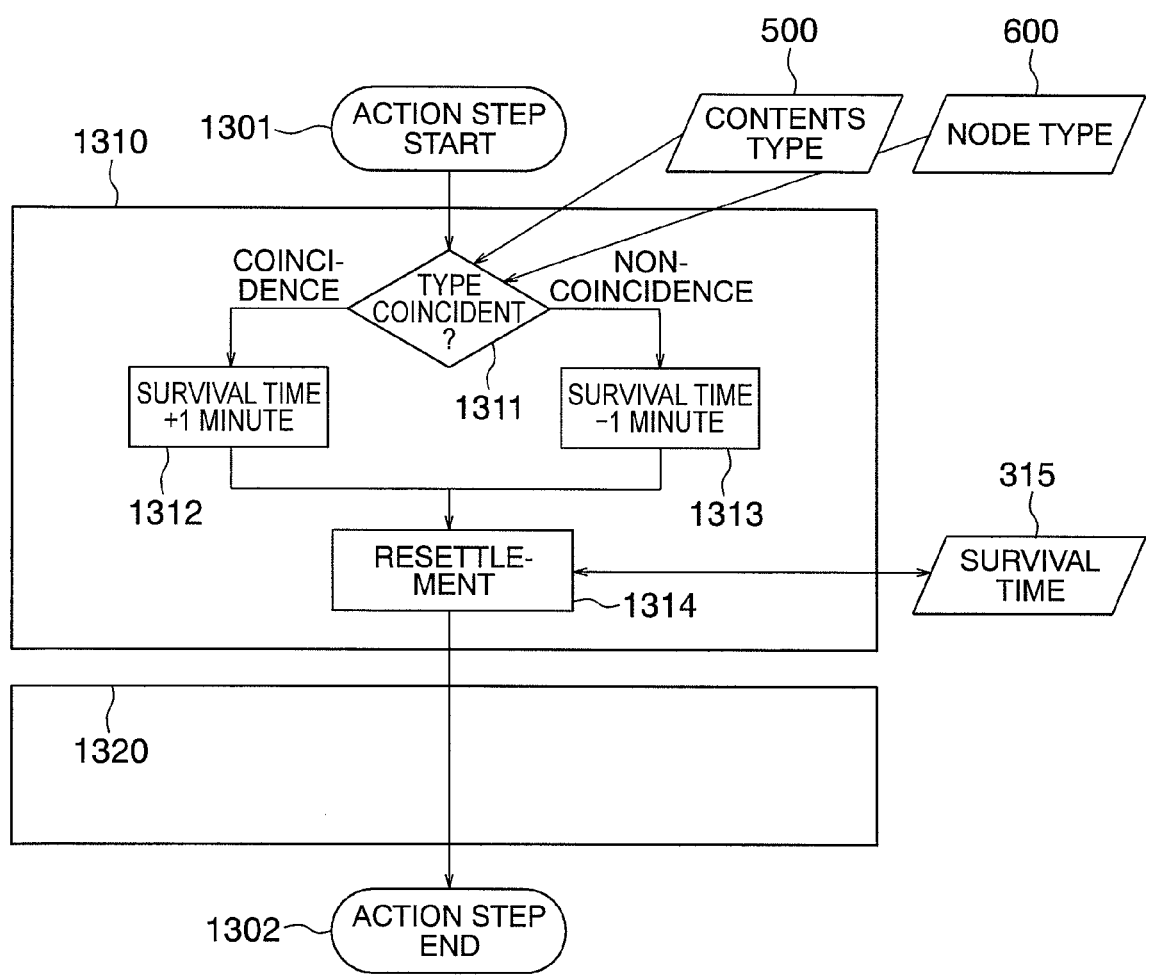
FIG. 13 is a flowchart of a contents action in the first embodiment.

At that time, propagation of information will be considered by utilizing the contents type and the node type as shown in FIG. 13. When a node receives contents, a contents action process is started (1301). If the node receiving the contents is of A type, contents type 500 coincides with node type 600 (1311). Accordingly, survival time is extended (1312) and survival time 315 is resettled (1314). In this example, only type action 1310 proceeds and state action 1320 is not executed because it is not described in contents action 314. Therefore, when the type action process ends, the action process ends (1302). In case the node receiving the contents is of B or C type, the survival time is so set as to be shorter.

Figure 14:
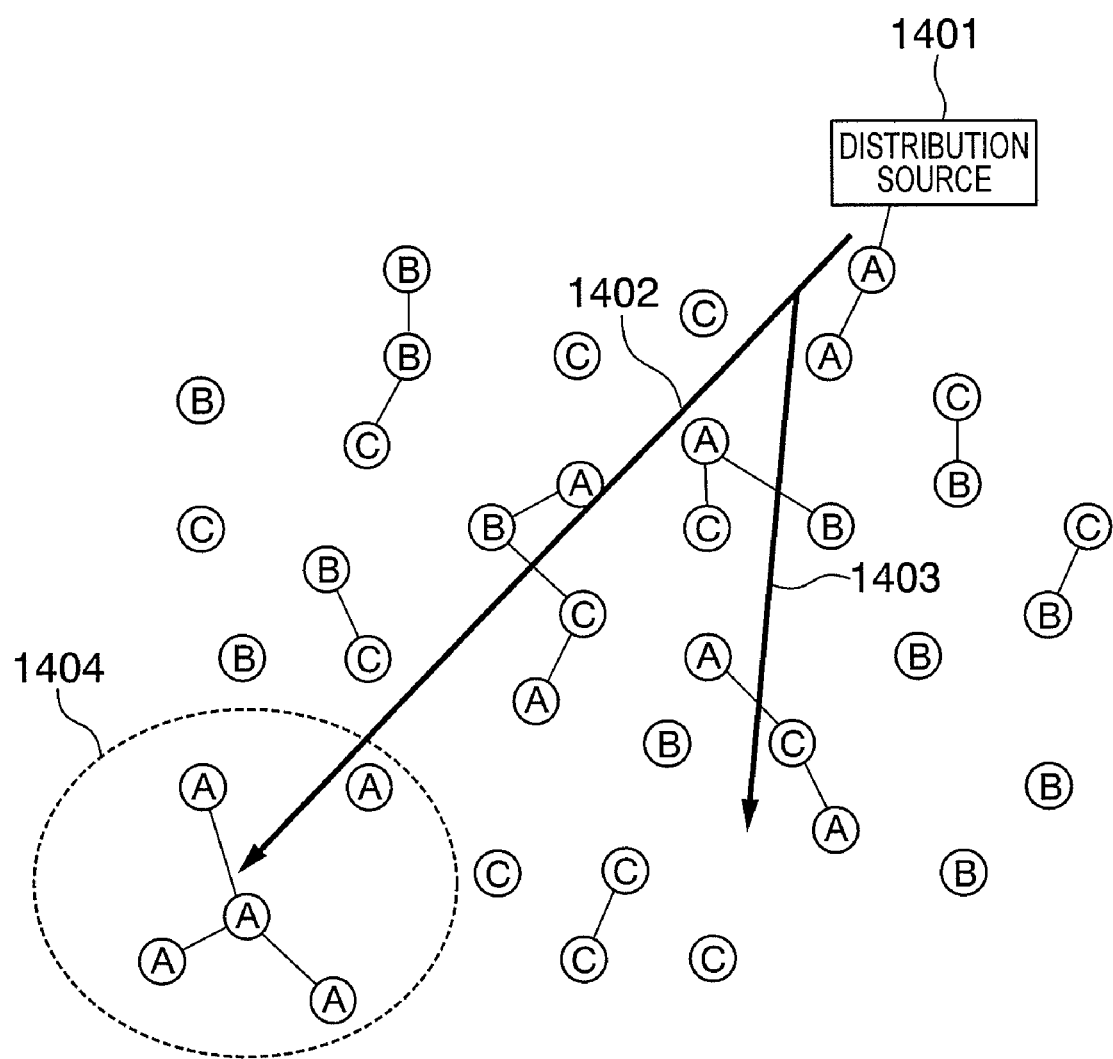
FIG. 14 is a diagram showing the effects of the first embodiment.

In the flow as above, the information propagates as shown in FIG. 14. The information propagates in a manner as shown by way of areas designated by 1402 and 1403 in which many A-type nodes exist. In an area in which nodes of B and C types abound, survival time is short and the information is difficult to propagate. As a result, advertising contents tends to gather in an area 1404 in which nodes of A type gather.

To describe an example to which the first embodiment is applied more specifically, it is assumed that for example, 1401 is a car shop, A is a person being highly interested in cars, B is an ordinary person and C is a person taking a less interest in cars. When the shop 1401 offers to a nearby node an advertisement for a new car trial ride party, the advertisement propagates through paths 1402 and 1403 as the individual nodes move. Further, in the area 1404 in which A type nodes gather, the information gathers voluntarily if the survival time is set properly. At that time, the information propagates through not only the A type nodes but also the B/C type nodes.

Next, a second embodiment using the present system will be described. The second embodiment intends to let a distribution source offer an advertisement and besides control an area through which the advertisement propagates in the ad hoc network.

Figure 15:
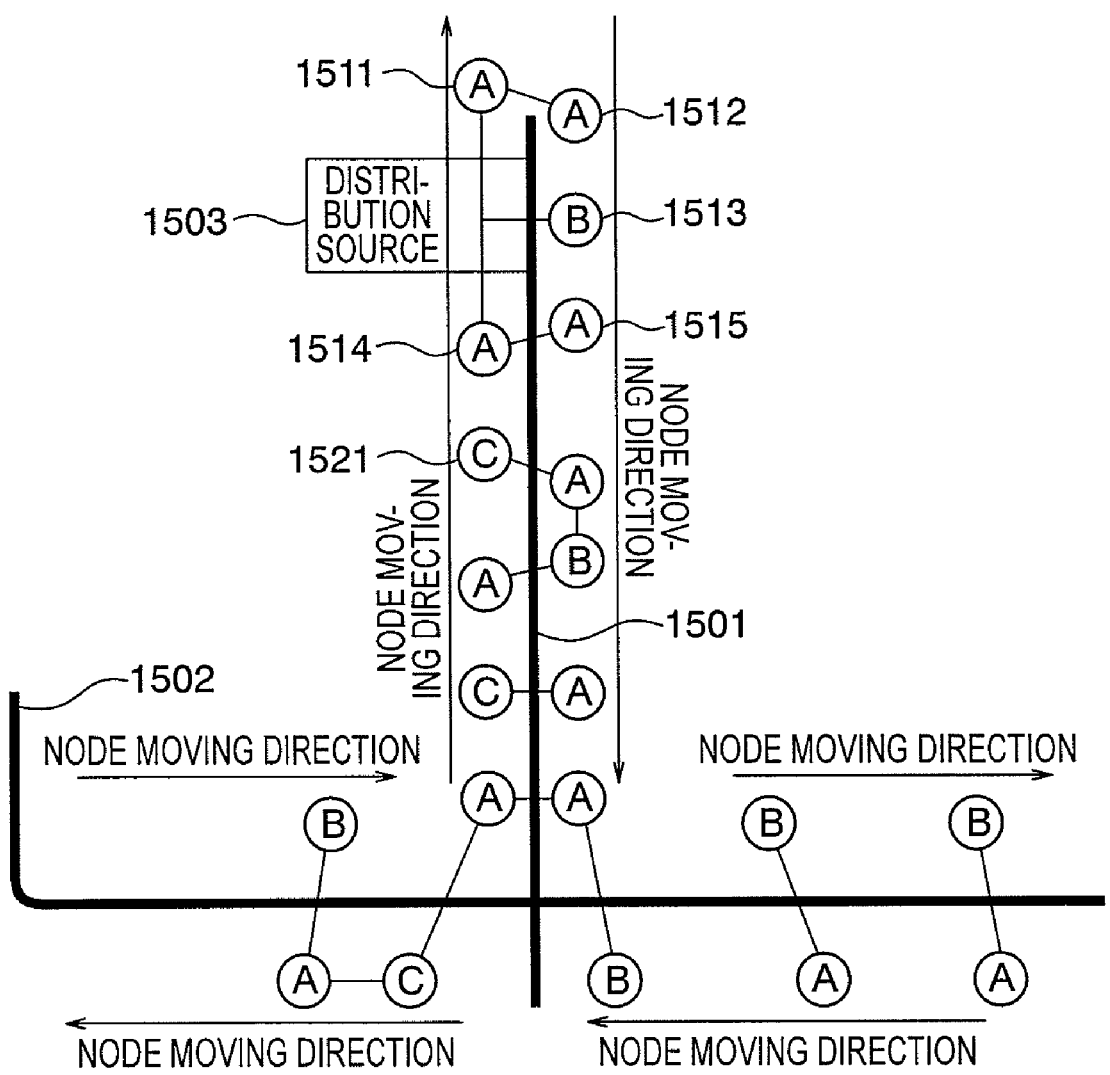
FIG. 15 is a diagram showing a configuration of a second embodiment in the ad hoc network.

Turning to FIG. 15, there is illustrated a configuration of an ad hoc network in which individual nodes move substantially along a route. Since the individual nodes search information periodically, advertising contents publicized by a distribution source 1503 propagates from 1511 to 1515. The information, however, does not propagate to a node 1521 not connected to the source by a network. In FIG. 15, an interest in the advertising contents of this example decreases sequentially toward C type from A type through B type.

Figure 16:
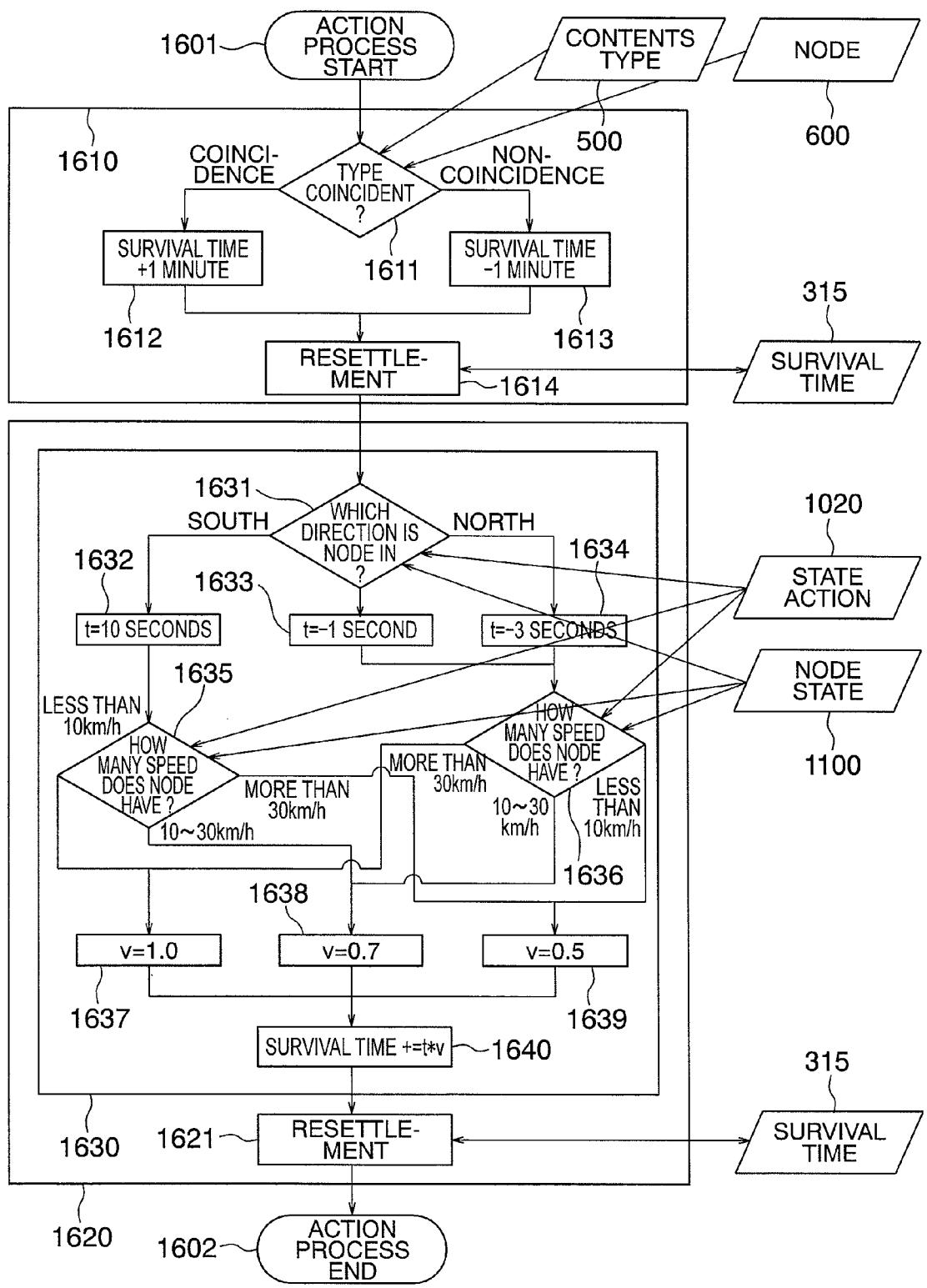
FIG. 16 is a flowchart of a contents action in the second embodiment.

At that time, an instance is considered in which the information is caused to propagate by utilizing the contents type, node type, state action and node state as shown in FIG. 16. When a node receives contents, a contents action process is started (1601). Firstly, action type 1610 is executed. Contents type 500 is compared with node type 600 (1611). When the two types coincide with each other, step 1612 is executed but when non-coincidence is determined, step 1613 is executed. In this example, survival time in A type node is increased by 1 minute and that in B and C type nodes is reduced by 1 minute. Subsequently, the thus determined survival time is resettled in survival time 315 (1614).

Thereafter, state action 1620 is executed. A process method for state action 1020 is used and individual parameters of node state 1100 are utilized to execute a process 1630 for calculating survival time. In the present example, the direction of the node is first determined (1631) and values of t are determined from steps 1632, 1633 and 1634, respectively.

Next, in the case of 1632, values of node state are used in step 1635 to execute steps of 1637, 1638 and 1639, respectively. With the steps 1633 and 1634 executed, values of node state are used in step 1636 to execute steps of 1637, 1638 and 1639, respectively. Subsequently, from values of t and v, a survival time is calculated (1640) and is resettled in the survival time 315 (1621). Through the above, the action process ends (1602).

Figure 17:
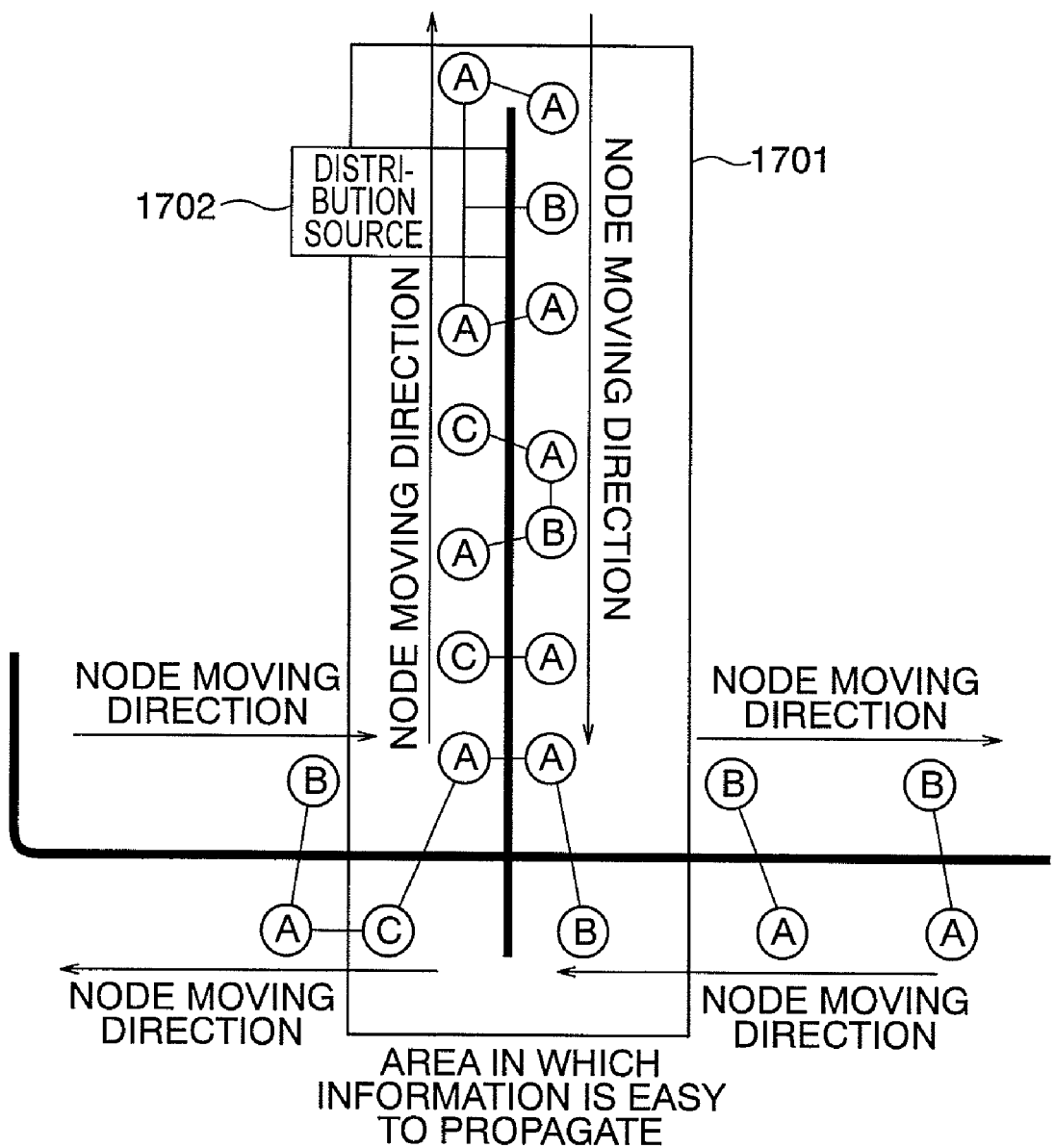
FIG. 17 is a diagram showing the effects of the second embodiment.

In the flow as above, the information propagates in the range approximating an area 1701 shown in FIG. 17. A distribution source 1702 can ensure that contents scheduled to be deleted within a short period of time can be propagated efficiently to a target area by way of nodes other than A type node.

In an example to which the second embodiment is applied more specifically, 1702 is a gasoline stand, for instance. In this instance, if a road across from the stand 1702 is for no-right turn and crossing and upper part of the drawing corresponds to north, the advertisement is less effective to cars running from north. In this case, if the fact that contents is received directly from the distribution source is deemed as passing by the distribution source and recorded in the node state, then the survival time will be reduced considerably in the state action in the case of cars passing by and running toward north and the survival time will also be reduced considerably in the state action in the case of cars not passing by and running toward south, in order that the information can be prevented from propagating widely toward north. In addition, when the survival time is extended in the case of cars not passing by and running toward north and the survival time is extended in the case of cars passing by and running toward south, propagation of the information toward south can be promoted. Further, an upper limit of survival time is set properly in terms of hour, information in excess of necessity can be prevented from being propagated toward south.

Next, a third embodiment using the present system will be described. The third embodiment intends to share information inside an area in the ad hoc network.

Figure 18:
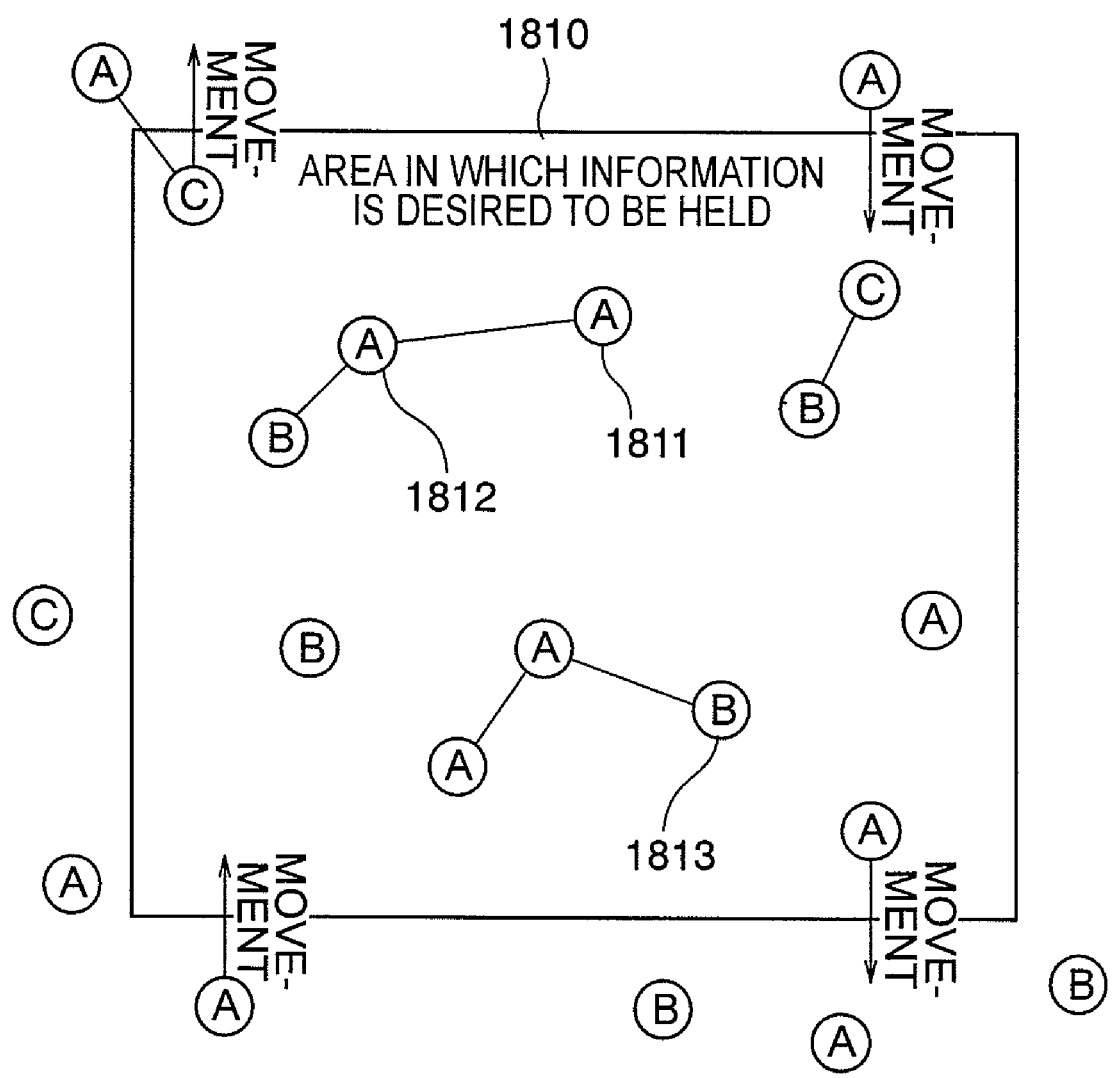
FIG. 18 is a diagram showing a configuration of a third embodiment in the ad hoc network.

Referring to FIG. 18, there is illustrated a configuration of an ad hoc network in which individual nodes move. Each node can communicate with the GPS (Global Positioning System) or a radio base station or short distance radio communication to know a position of its own. Since each node periodically searches information, contents publicized by a node propagates to all connectable nodes. In FIG. 18, an interest in the contents publicized by a node decreases sequentially toward C type from A type through B type. An area in which the information is desired to be held is designated by 1810. When a node 1811 publicizes contents, a node 1812 receives the contents. A node 1813 sometimes receives the contents when the ad hoc is reconstructed.

Figure 19:
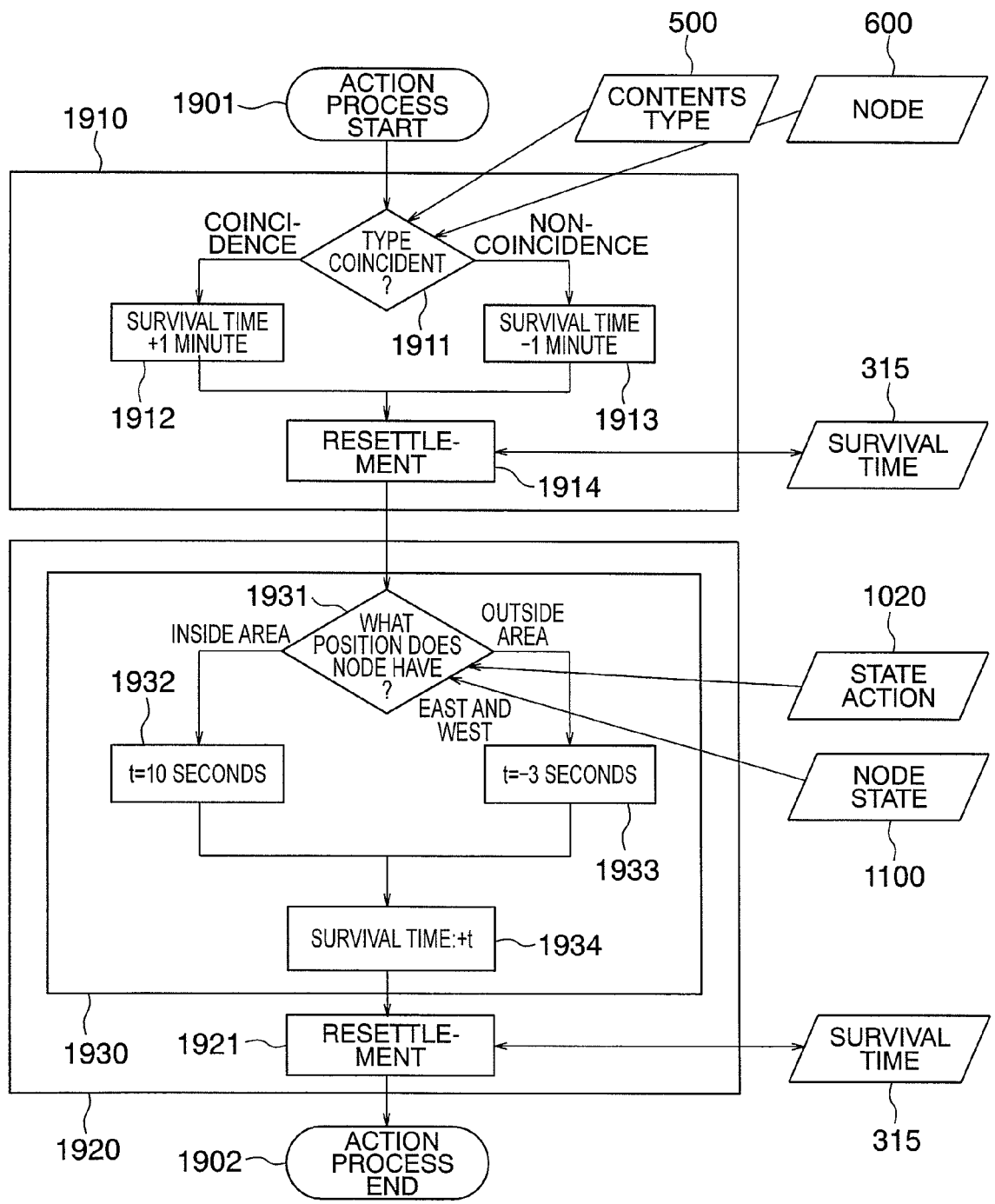
FIG. 19 is a flowchart of a contents action in the third embodiment.

At that time, propagation of information is considered by utilizing the contents type, node type, state action and node state as shown in FIG. 19. When a node receives contents, a contents action process is started (1901). Firstly, type action 1910 is executed. Contents type 500 is compared with node type 600 (1911). When type coincidence is determined, step 1912 is executed but when type non-coincidence is determined, step 1913 is executed. In this example, the survival time in A type node is increased by 1 minute and that in B and C types is reduced by 1 minute. Next, the thus determined survival time is resettled in the survival time 315 (1914). Next, state action 1920 is executed. By using a process method for state action 1020 and by utilizing each parameter of node state 1100, a process 1930 for calculating a survival time is executed. In the present example, a position of the node is first decided (1931) and step 1933 is executed when the position is outside the area but step 1932 is executed when the position is inside the area, thereby determining a value of t. Next, the value of t is added to the survival time (1934) and by using the thus determined value, the survival time 315 is resettled (1921). Through the above, the action process ends (1902).

Figure 20:
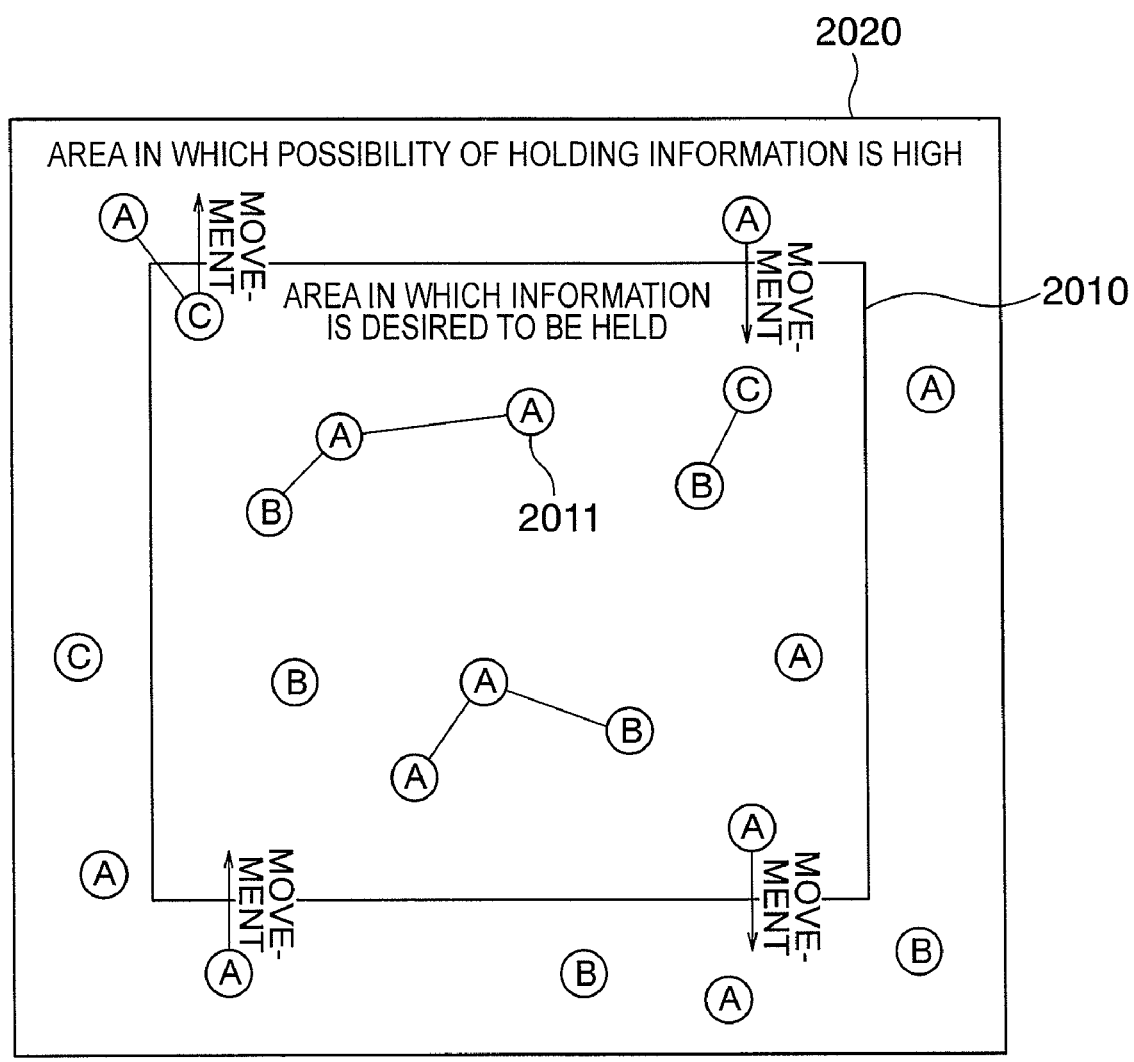
FIG. 20 is a diagram showing the effects of the third embodiment.

In the flow as above, the information propagates in the range approximating an area 2010 shown in FIG. 20. A distribution source 2011 can hold highly efficiently contents scheduled to be deleted within a relatively short period of time by way of nodes other than A type node. Further, when contents is received in an area 2020, for example, the node can be so determined in the step 1931 as to lie within the area or in the vicinity thereof and a time shorter than that in the step 1932 can be added to the survival time, whereby the possibility that the contents will exist in the area 2010 can be improved.

When, in an example to which the third embodiment is applied more specifically, the area is a composite institution formed of a theme park and a shopping mall, information directed to persons present in the institution is unnecessary for persons outside the institution. In such a case, by offering information through short distance radio inside the institution, setting an area by using latitude and longitude, extending the survival time of the information inside the area and reducing the survival time outside the area, the information can be propagated at a high probability in the area 2010 and at an appreciable probability, though lower than that in the area 2010, in the area 2020.

In the above propagation method, when contents is received repetitively by a plurality of nodes of the same type, there arises a problem that the same contents action repeats itself. Therefore, every contents is allotted with a sole ID and when contents of a certain ID is received at first, the contents ID is saved on the memory of node, whereby when contents is received next, it is confirmed whether the same contents was received in the past and if the same contents was received in the past, the contents of interest is deleted immediately.

Under spatial restriction such as radio propagation range, the foregoing description presupposes the P2P network constituted by an ad hoc network formed cooperatively by nodes at the spot but for example, in an environment such as Internet in which all nodes are connectable to each other, a group dynamically formed from nodes may be a part of the ad hoc network. For example, when nodes gathering in a bulletin board on a network are put together to set up a group and a P2P network permitting communication only within the group is established, such a P2P network as above resembles an ad hoc network formed under spatial restriction when the group breaks up, constituent members of the group change or a different group is set up.

Searching information from a different node has been described as being made periodically with a view to simplifying setting but this is not limitative. For example, information may be searched in a time zone such as in the middle of night during which the communication traffic is not congested. In this manner, troubles attributable to communication traffic congestion can be avoided.

According to the foregoing embodiments, since contents allotted with survival time is received, the survival time can be set on the transmission side and contents distribution can be controlled on the contents distribution side. Further, the survival time allotted to the received contents can be changed and hence a survival time conforming to tastes of an information terminal receiving the contents can be set. In addition, the contents allotted with the survival time is transmitted to a different information terminal and therefore the survival time at the different information terminal representing a transmission destination can be controlled.

Thanks to the above, the contents allotted with the survival time can be circulated in the P2P system so that the memory of the information terminal may be prevented from being punctured. Further, the survival time can be changed in conformity with tastes of users of individual information terminals and therefore, even when contents unsuitable to the tastes must be stored in the memory of user for the sake of contents circulation, the survival time can be changed to shorter one and contents unnecessary for the user can be deleted early.

Further, when changing the survival time of the received contents, shortening thereof can be permitted but immediate deletion thereof can be inhibited, whereby such a situation that the contents does not circulate because the contents of interest is unsuited to tastes of a user and deleted immediately after reception can be prevented.

According to the foregoing embodiments, in an information terminal, information can be collected effectively without laying information about tastes of a user open to a different information terminal. Further, information having passed through a terminal having a taste to which the information is unsuited can be shared.

Next, a fourth embodiment of the invention will be described. The fourth embodiment is concerned with an information terminal and system for redistributing distributed contents allotted with survival time to a different P2P node. Characteristically of this embodiment, the survival time is handled differently for point contents and other normal contents. Also characteristically of the present embodiment, the point contents is handled preferentially to the normal contents and a point is given in reward for this preferential handling. The point contents referred to herein is contents distributed in a point system to be described in connection with the present embodiment.

The following description will be given by way of example of the first to third embodiments but this is not limitative. For example, an embodiment may be conceivable in which in a system not performing the contents action 804 formed of type action 910 and state action 920, the allotted survival time is changed or the changing rate is changed depending on whether the contents is point contents or normal contents.

The fourth embodiment is directed to a system in which the survival time of point contents such as advertisement distributed by an information distribution enterpriser to a P2P node is handled preferentially and the information distribution enterpriser pays an equivalent for the preferential handling. An equivalent for an extension is evaluated as a point. The preferential handling of the survival time of point contents will be exemplified as below. When a memory area of node participating in the P2P system has room, the survival time of point contents is extended at a longer rate than that of normal contents. In another example, however, the memory area has no room, so that the survival time of point contents is shortened at a shorter rate than that of normal contents or only the survival time of normal contents is shortened while keeping the survival time of point contents intact.

In the first to third embodiments, the condition for changing the survival time and the degree of change are left to the discretion of the information distribution enterpriser. Under the circumstances, some of information distribution enterprisers set extension of the survival time of contents to an unnecessarily long value, giving rise to a possibility that the survival time will become in fact infinite. When considering all P2P nodes as one system, most of contents inside the system give way to the aforementioned contents. Then, the memory area of many nodes is always used up to an upper limit and the nodes delete contents before it comes to its survival time. In other words, the survival time per se loses its meaning. This approximates a status in which in electronic mail frequently transmitting unwanted advertisement mail, a mail box filled with unnecessary advertisement mail in excess of its capacity overflows to prevent mail necessary for a user from being delivered.

Then, in the fourth embodiment, a scheme is provided in which membership system service is set up to permit an information distribution enterpriser to coexist with users. Especially, this scheme is centered on a point that in compensation for handling of point contents on a node preferentially to normal contents (for example, causing the point contents to be so set as not to be deleted until it comes to the survival time), the information distribution enterpriser gives a point to the user and a point management center modifies the survival time desired by the information distribution enterpriser to a value optimized for the overall system by taking various conditions into consideration. Unless the point contents is handled preferentially to the normal contents (for example, the point contents is deleted by the user before it comes to the survival time), the point is automatically cancelled.

Figure 22:
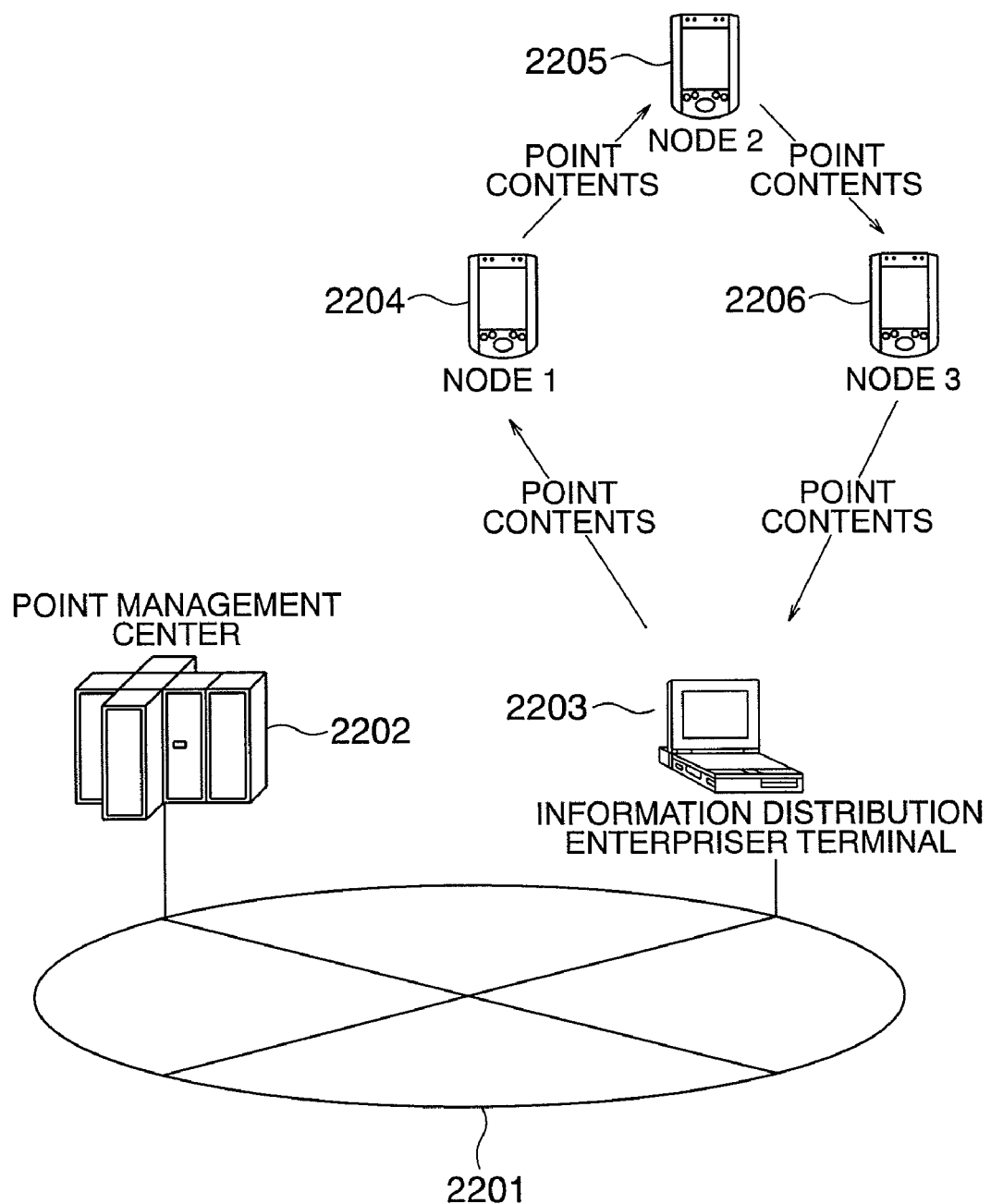
FIG. 22 is a diagram showing a system configuration of a survival time extension system with point.
Figure 23:
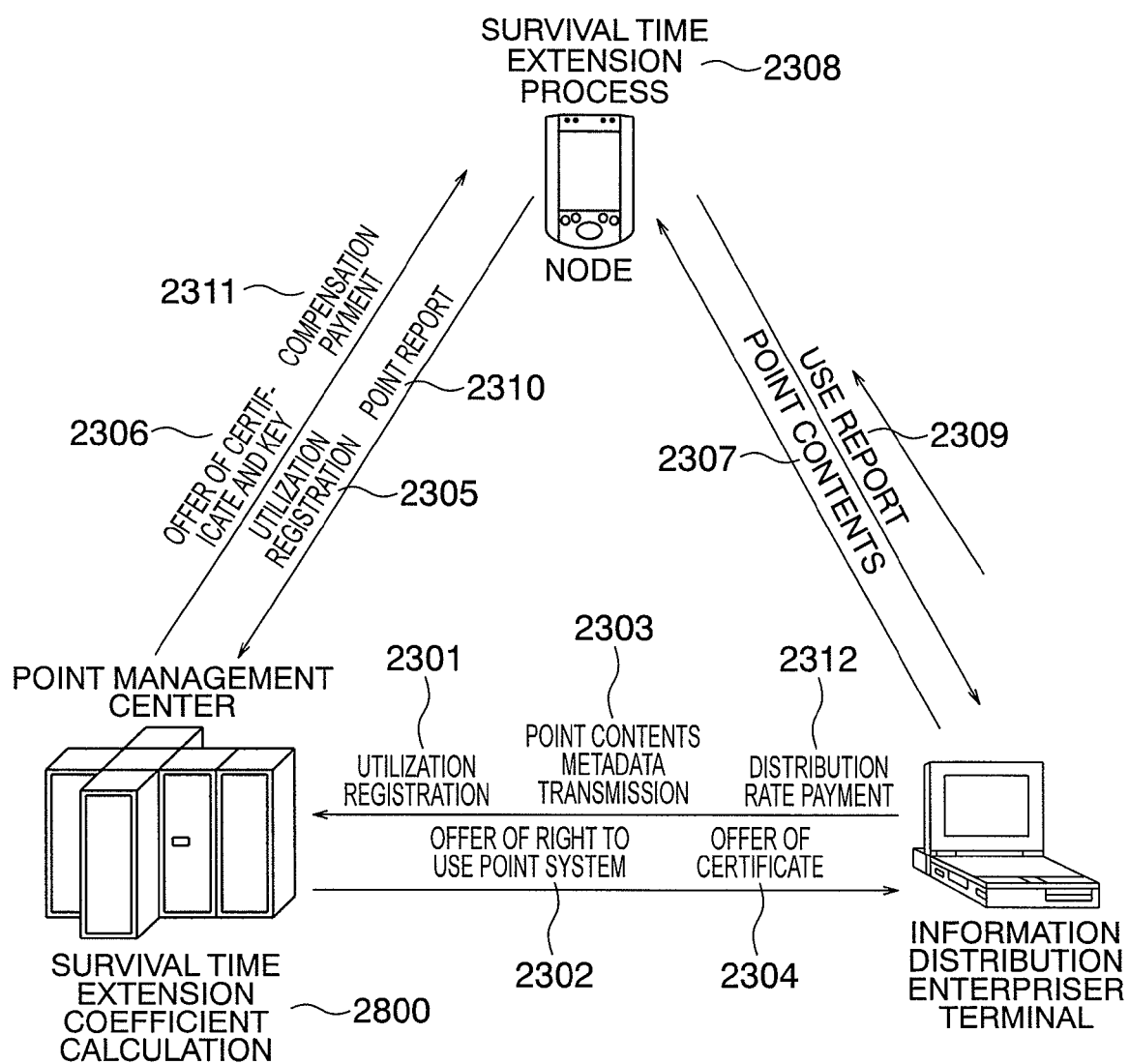
FIG. 23 is a diagram useful in explaining processes in the survival time extension system with point.
Figure 24:
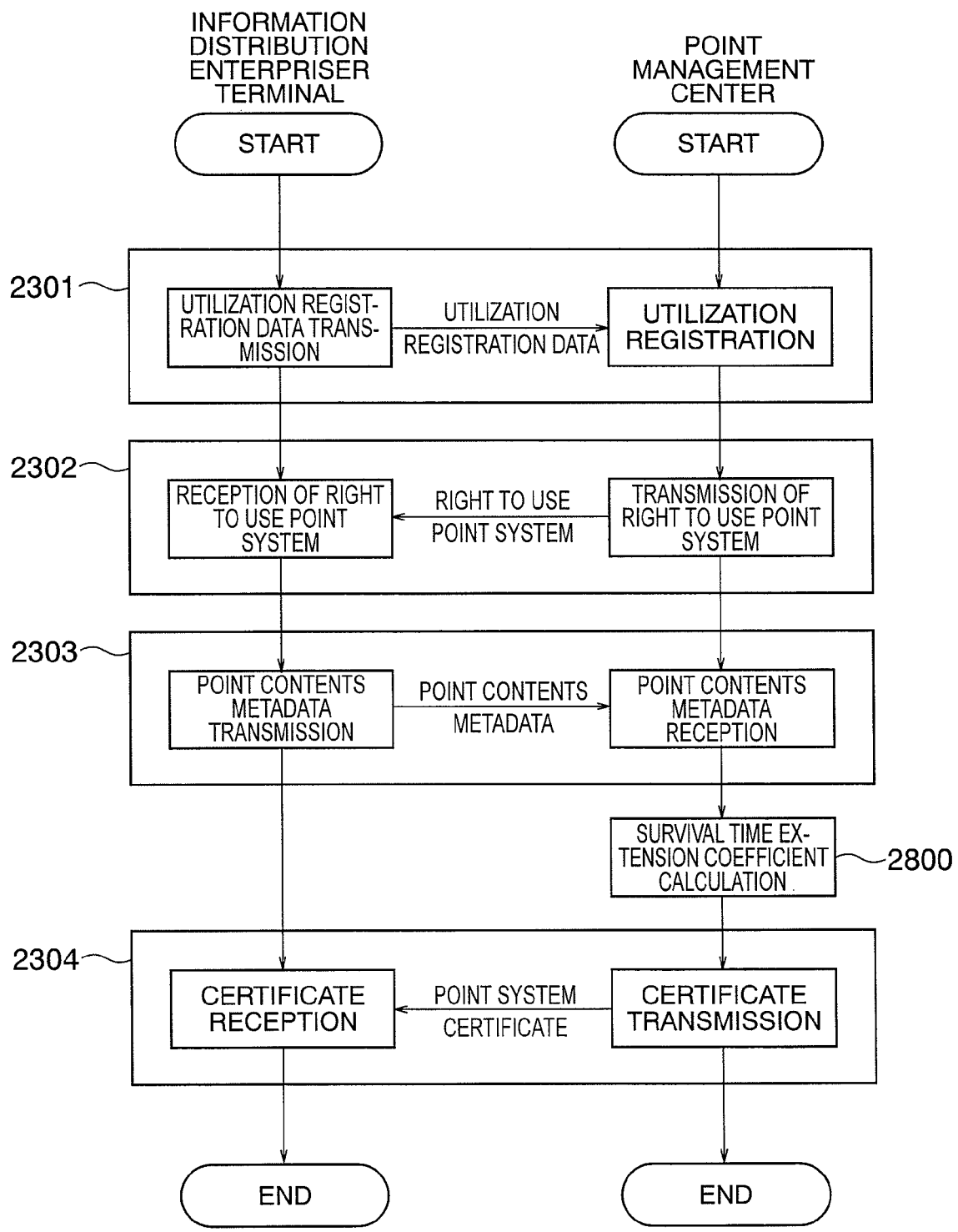
FIG. 24 is a diagram useful in explaining a process carried out by an information distribution enterpriser to make preparation for utilization of the system.

The fourth embodiment will now be described with reference to the drawings. A survival time extension system with point is constructed as shown in FIG. 22. Reference numeral 2201 designates a wide area network, 2202 a point management center, 2203 an information distribution enterpriser terminal, and 2204 to 2206 nodes mutually connected in a P2P fashion. The point management center 2202 is a terminal for controlling a system adapted to add a point in compensation for an extension of survival time. The information distribution enterpriser terminal 2203 is a terminal corresponding to, for example, a POS terminal of a restaurant or convenience store. The nodes 2204 to 2206 are nodes set forth so far in connection with the first to third embodiments and nodes to be described hereinafter in connection with the fourth embodiment. The nodes 2204 to 2206 need not be connected constantly to the point management center 2202 but may be connected to the center 2202 when they use it.

Next, the flow in the survival time extension system with point will be described with reference to FIGS. 23 to 26. The information distribution enterpriser applies to the point management center for utilization registration (2301). Utilization registration data transmitted in utilization registration transmission includes an enterpriser ID and/or enterpriser name for identifying the information distribution enterpriser and conditions for a charge for extension of survival time. Alternatively, the point management center may give the enterpriser ID. The conditions for a charge may be itemized such that when a node uses point contents to the information distribution enterpriser, a predetermined amount of money is charged in proportion to the number of use operations, that a predetermined ratio of an amount of money the node paid when the node uses the point contents is charged, that a predetermined amount of money is charged for the extension of survival time of the point contents by the node, and that when the node increases survival time in resettlement thereof, a predetermined amount of money is charged for multiplication of an increased amount of survival time by a coefficient of one or more. Excepting the above, similar charge conditions may be included, itemizing a charge in compensation for the extension of survival time of the point contents and a charge in compensation for the result of the use of the point contents. In addition, the information distribution enterpriser may set an upper limit of charging. The point management center receiving the utilization registration registers these conditions and data in the point management center.

Next, the point management center offers a right to use the point system to the information distribution enterpriser (2302). The right to use the point system includes a right to certificate request which is a right to cause the point management center to prepare a certificate including a survival time extension coefficient. The above steps 2301 and 2302 are conducted between the information distribution enterpriser and the point management center in preparation for the use of the present system by the information distribution enterpriser.

Next, steps 2303, 2800 and 2304 which are pre-steps preceding transmission of point contents when the information distribution enterpriser uses the point system will be described.

When using the right to request certificate, the information distribution enterpriser transmits, to the point management center, point contents metadata 2700 representing metadata concerning point contents the enterpriser distributes to a node and the point management center receives it (2303). The point management center saves the received contents metadata and calculates a survival time extension coefficient from the point contents metadata (2800). The point management center prepares a point system certificate including the calculated coefficient and transmits it to the information distribution enterpriser terminal (2304). The point system certificate may be encrypted by the point management center with a private key and the reliability of the certificate may be guaranteed by distributing a public key to, for example, the node. The step 2304 may be executed at an arbitrary timing that the point management center determines the change of the survival time extension coefficient. For example, the step may be executed at a timing that the point management center detects that the survival time extension coefficient in the initially issued certificate is an ineffective value and the execution value of use report 2309 is underestimated as compared to that scheduled by the information distribution enterpriser or that the survival time extension coefficient is excessively large and the execution of use report 2309 is overestimated as compared to that scheduled by the information distribution enterpriser.

Next, steps 2305 and 2306 carried out by the node in relation to the point management center in preparation for utilization of the point system by the node. The node applies to the point management center for utilization registration (2305). In the utilization registration by the node, the node transmits to the point management center a node ID and/or user name for identification. In an alternative, the node ID may be given by the point management center. The node may transfer data concerning tastes of a user saved in the node when applying the utilization registration. During the utilization registration, the node receives a public key to a point system certificate from the point management center (2306).

Next, steps 2307 and 2308 of distributing contents by using the present point system will be described. The information distribution enterpriser terminal transmits point contents to the node (2307). In the event that the node has not completed the utilization registration of the point system, the received point contents behaves as normal contents as in the case of the first to third embodiments. When the node has completed the utilization registration of the point system, that is, the node is a member of the present service system, the step 2308 of survival time extension process to be described later is carried out. This step is also executed not only when point contents is received directly from the information distribution terminal but also when point contents is received from a different node 2205 or 2206.

When the node can communicate directly with, for example, a POS terminal of convenience store representing the information distribution enterprise terminal within a survival time of the point contents extended on the basis of a will of the user or a survival time extension coefficient, it informs the information distribution enterpriser terminal of holding the point contents (2309). The reported data is transferred to the point management center. The point contents distributed in the step 2307 may include information such as coupon or position information of the information distribution enterpriser, which information indicates that holding of the point contents until direct communication between the information distribution enterpriser terminal and the node is started is beneficial. The step 2309 is for enabling the information distribution enterpriser terminal to receive a use report in order to verify the delivery range or validity of the point contents and this step will sometime be unexecuted depending on the type of node.

Next, steps 2310, 2311 and 2312 for letting the information distribution enterpriser pay a distribution rate to the point management center on the basis of a point report by the node will be described. Periodically or when points are accumulated to a certain extent, the node applies the use of held points to the point management center automatically or under the direction of the user (2310). With points used, points on the node decrease by a used amount. The point is exchanged with a valuable object such as money or a virtual currency usable at the information distribution enterpriser terminal at a rate designated by the point management center. A result of the exchange may be transmitted to the node (2311).

The information distribution enterpriser terminal pays a fee of distribution of point contents in accordance with actual results of use of the point contents (2312). In calculating the distribution fee, the charging condition set in the step 2301 may be used.

Referring now to FIG. 27, the point contents metadata will be explained. The point contents metadata is data for explaining in detail the contents data indicated at 320 and is obtained by partly expanding the data of contents type indicated at 313 and contents action indicated at 314. Denoted by 2701 to 2705 are examples of point contents metadata which may sufficiently be data adapted to explain the point contents. The point management center calculates a survival time extension coefficient by using part of the point contents metadata.

The survival time extension coefficient will be described by making reference to a calculation flowchart of FIG. 28 and a table of FIG. 29. When the process is started, a reference value is first calculated and added to an extension coefficient (2801). The reference value is an extension coefficient determined by a money amount only and a calculation formula is given by, for example, a function format designated at 2811. In the step 2811, for example, a reference value of 1.5 when a basic money amount is 100,000 yen and a reference value of 3 when the basic money amount is 1,000,000 yen are calculated by using a basic rate function held in the point management center. Next, a metadata fit coefficient is determined using database 2812 and added to the extension coefficient (2802). The metadata fit coefficient is a value used for deriving a coefficient value by which the survival time of contents is multiplied when the contents collection setting of FIG. 5 is carried out or when metadata 2902 matches with data of age of the user set in the node. The database 2812 is a set of coefficient values empirically determined by the point management center and for example, when object age 2911 is an important parameter in the point system, a fit coefficient to the object age increases. Subsequently, balance data is added to the extension coefficient (2803). The balance data is an adjust value by which the total sum of reference value 2921 and fit coefficient 2903 is multiplied.

The balance data is a value for causing the extension time determined in the steps 2801 and 2802 to approach an optimum solution to the point contents. For example, the value determined in the steps 2801 and 2802 is a value empirically settled by the pointer management center but it is not always a correct value for the point contents. The optimum solution changes owing to various factors such as seasons, weather and network loads and it can hardly be settled by calculation. Therefore, the point management center changes the extension coefficient by using the balance data to cause it to approach a use report 2309 presumed by the information distribution enterpriser. Database 283 is of balance data based on experience as above.

The steps 2801 to 2803 participate in an example of extension coefficient calculation and another calculation method may be used provided that the coefficient by which the survival time is eventually multiplied can be determined by using data the node has. The balance data also functions as an adjust value conforming to the load of the system. For example, when the point contents circulates through nodes up to a limit capacity of the system, the memory area of most of the nodes is filled up with the point contents and consequently, the point contents must be deleted at node's discretion before it comes to the survival time or reception of new contents must be rejected. Under the circumstances, the survival time system does not function sufficiently and the load on the system must be lowered. In such an event, by reducing the balance data and shortening the survival time of point contents to be distributed newly, the load on the system can be mitigated and the memory area of the node can have room, so that the point contents can survive on the node until it comes to the survival time. If the memory areas of many nodes have sufficient room, that is, the system capacity is bearable, the value of balance data can be increased and the system load can be raised. The value of the balance data is determined empirically by measuring the system load mainly on the basis of use report 2309, network monitoring and a report from a node cooperating as a monitor.

The thus determined survival time extension coefficient is composed of type 2901 indicative of the kind of data the node has, its data 2902, fit coefficient 2903 used when the coefficient matches with data the node has, reference value 2921 and balance data 2922. In the present example, when the user holding the node is, for example, 24 years old, the collection contents has its large class sorting as being shopping, its middle class sorting as being discount and its small class sorting as being tire, 0.1 for large category 2912 and 0.2 for medium category 2913 are used as the fit coefficient to provide a fit coefficient of 0.3 in total. This is added with a reference value and multiplied by balance data to obtain an ultimate extension coefficient of 1.425.

A survival time extension step 2308 using the survival time extension coefficient determined through the above procedures will be described. The survival time extension step 2308 uses the survival time extension coefficient to calculate an ultimate extension coefficient from data the node has. The survival time extension step 2308 is executed in the action steps 901 to 925. In the step 912 and 922, a survival time which can be set without resort to the point system is calculated. When the point system is utilized, the thus determined survival time is extended and therefore, in any of the steps 911 to 922, the survival time is multiplied by an ultimate extension coefficient so as to be extended. The extended survival time has a survival time upper limit 316 determined by setting or a survival time upper limit newly added to the point content metadata. When using the present system, the node must discriminatively handle the point contents and the normal contents in the delete procedure prevailing before the survival time is reached. The node can delete the point contents before it comes to the survival time but concurrently with the deletion, the node deletes a corresponding point without fail.

Next, a procedure for writing the obtained point in the memory area of the node in the survival time extension step 2308 will be described. Assumptively, the obtained point corresponds to the ultimate extension coefficient or extended survival time determined in the step 2308. The obtained point is written in a point save area of the node. The point save area of the node is a data save area which cannot be altered by the user. The data can be written into the point save area by means of a P2P middleware corresponding to the point system can write data in the point save area. The P2P middleware has a private key and a public key and when changing point information, uses the private key to write the point information. Further, when the middleware needs to read point information, it reads the point information by using the public key. For example, when the node receives information with point and has extended the survival time, it is necessary to add a newly acquired point to the already acquired point. At that time, the point information is read by using the public key and written by using the private key. A counterpart of the public key is held by the point management center and is used in point report step 2309.

As will be seen from the above, according to the fourth embodiment, the point contents is contents added with a certificate necessary for the node to utilize the point system and data such as a survival time extension coefficient. The node not utilizing the point system does not use the area added to the point contents and can handle the point contents similarly to normal contents. The node utilizing the point contents consults the area added to the point contents to recognize that the contents utilizes the point system.

In the fourth embodiment, the survival time of point contents is handled preferentially and hence the point management center performs the survival time extension coefficient calculation 2800. But, as the case may be, it is preferable that the node calculates the survival time extension coefficient. In this case, too, a point is given in compensation for preferential handling of the survival time of the point contents. But the point management center does not participate directly in calculation of the survival time extension coefficient, with the result that there is a possibility that the node allots to it more points than those allotted when compared to the case where the survival time extension coefficient is calculated by the point management center. Accordingly, the ratio of allotment of point may be made to be smaller than that controlled by the point management center to realize suitable point allotment.

According to the fourth embodiment, advantages as below can be obtained. As the contents amount inside the system increases to some extent, the node runs short of the memory area. In such an event, the node or the user of node is required to delete contents before its survival time expires. Point contents, however, can persist on the node until the survival time expires and can circulate inside the system. On the other hand, the normal contents not using the point system is nominated for a candidate for deletion and is deleted from the node earlier as compared to the point contents. In other words, by using the survival time extension system with point, the information distribution enterpriser can increase the possibility of circulation of contents such as advertisement, to advantage.

Further, in the information terminal, the user can get a reward in compensation for contribution to distribution of advertisement, for instance, transmitted by another person to many other persons. A distributor of advertisement can be dominant over another distributor not utilizing the present system in distribution of advertisement and the survival time of advertisement has an amount suitable for the system, so that the advertisement can be circulated effectively. In addition, the point management center can receive a use rate of the present system from the distributor.

In the foregoing embodiments, the "information terminal" has been described exemplarily as being a terminal possessed by an end user and adapted to process information but even when it is not a terminal but is a unit carrying out the information process described in connection with the embodiments on the way, the foregoing embodiments can obviously be applied to such a unit.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information terminal comprising:
   a network interface to receive contents containing survival time, wherein the survival time is preset before being received by said network interface, by a transmission side of the contents; and
   a central processing unit to control the information terminal,
   wherein the central processing unit changes the survival time contained in the contents received by said network interface,
   wherein the central processing unit transmits said contents containing the survival time to a different information terminal via a network,
   wherein the central processing unit deletes said contents after the survival time changed by said central processing unit has expired, and
   wherein the survival time contained in the contents is changed by the central processing unit before the contents are transmitted by the central processing unit.

2. The information terminal according to claim 1 further comprising a memory to stores a node type indicative of the kind of a node in the present information terminal,
   wherein the contents received by said network interface is allotted with a contents type indicative of the kind of contents; and
   said central processing unit changes said survival time on the basis of the contents type allotted to said received contents and the node type stored in said memory.

3. The information terminal according to claim 2, wherein said memory stores a positive collection node type representing a node type desired to be collected positively, and said central processing unit extends said survival time by a first predetermined time when said contents type coincides with said positive collection node type.

4. The information terminal according to claim 3, wherein said central processing unit shortens said survival time by a second predetermined time when said contents type does not coincide with said positive collection node type.

5. The information terminal according to claim 4, wherein said memory stores a collection refusal node type representing a node type desired to be refused to be collected, and said central processing unit shortens the survival time by a fourth predetermined time longer than said second predetermined time when said contents type coincides with said collection refusal node type.

6. The information terminal according to claim 3, wherein said memory stores a negative collection node type having a less degree of desirability for collection than that of the positive collection node type, and said central processing unit extends the survival time by a third predetermined time shorter than said first predetermined time when said contents type coincides with said negative collection node type.

7. The information terminal according to claim 2, wherein said central processing unit detects a node state representing a state of the present information terminal, wherein said received contents is allotted with a terminal state representing a state of the information terminal, and said central processing unit changes said survival time on the basis of the terminal state allotted to said received contents and the node state detected by said central processing unit.

8. The information terminal according to claim 7, wherein said node state includes a moving direction or moving speed of the present information terminal.

9. The information terminal according to claim 1, wherein said survival time is indicated in terms of an hour.

10. The information terminal according to claim 1, wherein said survival time is indicated in terms of a time from the reception by said network interface.

11. The information terminal according to claim 1, wherein said central processing unit changes the survival time allotted to said contents when said network interface receives said contents.

12. The information terminal according to claim 1, wherein said central processing unit searches and collects said contents.

13. The information terminal according to claim 1, wherein the survival time allotted to said contents is set with an upper limit, and said central processing unit changes said survival time within a range not exceeding said upper limit.

14. The information terminal according to claim 1, wherein said central processing unit transmits the contents to a different information terminal while keeping the survival time allotted upon reception by said network interface intact irrespective of the presence or absence of the change of survival time by said central processing unit.

15. The information terminal according to claim 1, wherein said central processing unit transmits the contents allotted with a changed survival time to a different information terminal when the survival time is changed by said central processing unit.

16. An information sharing method comprising:
a reception step of receiving contents containing survival time, wherein the survival time is preset before being received, by a transmission side of the contents;
a survival time change step of changing the survival time contained in said contents received in the reception step, such that the survival time extinguishes at an hour later than an hour for the reception;
a transmission step for transmitting the contents containing a survival time changed in said survival time change step to a different information terminal via a network; and
a delete step for deleting said contents after the survival time changed in said survival time change step has expired,
wherein the survival time contained in the contents is changed by the survival time change step before the contents are transmitted by the transmission step.

17. A P2P system having first, second and third information terminals and sharing contents, wherein
said first information terminal transmits contents containing survival time which is preset, to said second information terminal via a network;
said second information terminal changes the survival time contained in said transmitted content; and
said second information terminal transmits said contents containing survival time to said third information terminal via a network, whereby
said contents is shared,
wherein the survival time contained in the contents is changed by said second information terminal before the contents are transmitted by said second information terminal, and
wherein the contents are deleted after the survival time changed by said second information terminal has expired.

18. The P2P system according to claim 17, wherein the survival time of said contents transmitted to said third information terminal, is the survival time changed by said second information terminal.

19. A P2P system according to claim 17, wherein the survival time allotted to said contents transmitted to said third information terminal, is the survival time allotted by said first information terminal.

20. An information terminal comprising a network interface for receiving contents, memory for storing contents, transmission unit for transmitting contents, survival time change unit for changing survival time of contents and delete unit for deleting contents, wherein
said network interface receives contents containing survival time, wherein the survival time is preset before being received by said network interface, by a transmission side of the contents;
said memory includes received contents memory for storing the contents received by said network interface and unpublished contents memory for storing contents desired not to be publicized to a different information terminal;
said survival time change unit changes survival time contained in the contents stored by said reception contents memory;
said transmission unit transmits, when a different information terminal searches contents and the contents to be searched is stored in said received contents memory, said contents containing survival time to said different information terminal via a network, but does not transmit said contents to said different information terminal when said contents is stored in said unpublished contents memory; and
said delete unit deletes said contents stored by said received contents memory after the survival time changed by said survival time change unit has expired,
wherein the survival time contained in the contents is changed by the survival time change unit before the contents are transmitted by the transmission unit.

21. An information terminal comprising:
a network interface to receive contents containing survival time, wherein the survival time is preset before being received by said network interface, by a transmission side of the contents; and
a central processing unit to control the information terminal,
received contents memory for storing the contents received by said network interface;
survival time change unit for changing the survival time contained in said contents stored in said received contents memory;
transmission unit for transmitting, when contents is searched from a different information terminal and the contents to be searched is stored in said received contents memory, said contents containing the survival time to said different information terminal via a network; and delete unit for deleting the contents stored in said received contents memory after the survival time changed by said survival time change unit has expired, wherein the survival time contained in the contents is changed by the survival time change unit before the contents are transmitted by the transmission unit.

22. An information terminal comprising:

network interface for receiving first contents containing survival time and second contents containing survival time, wherein the survival times of the first contents and the second contents, are preset before being received by said network interface, by a transmission side of the first contents and the second contents;

survival time change unit for changing the survival times contained in the first contents and second contents received by said network interface;

transmission unit for transmitting the first contents and second contents containing survival times to a different information terminal via a network; and delete unit for deleting the first contents and second contents after the survival times changed by said survival time change unit have expired, wherein said survival time change unit handles the survival time of said first contents preferentially to the survival time of said second contents, wherein the survival times contained in the first and second contents is changed by the survival time change unit before the contents are transmitted by the transmission unit.

23. The information terminal according to claim 22, wherein when said survival time change unit performs preferential handling, a point is gained in compensation for the preferential handling.

24. The information terminal according to claim 22, wherein said preferential handling is to extend the survival time of said first contents at a larger rate than the survival time of said second contents.

25. The information terminal according to claim 22, wherein said preferential handling is to shorten the survival time of said first contents at a smaller rate than the survival time of said second contents.

26. The information terminal according to claim 22, wherein said preferential handling is to shorten the survival time of said second contents while keeping the survival time of said first contents unchanged.

27. A point system comprising an information terminal, an information distribution enterpriser terminal and a point management center, wherein said information distribution enterpriser terminal transmits utilization registration data of the point system to said point management center via a network;

said point management center allows utilization of the point system on the basis of the transmitted utilization registration data;

said information distribution enterpriser terminal transmits, to said point management center, metadata of point contents desired to be transmitted to said information terminal via a network;

said point management center calculates a survival time extension coefficient representing a coefficient of extension of the survival time of the point contents and transmits it to said information distribution enterpriser terminal via a network; and said information terminal receives said point contents wherein a survival time is set for said points contents before being received by said information terminal, by the transmission side of said points contents, wherein said information terminal changes the survival time of said received point contents by using said survival time extension coefficient, transmits said point contents containing survival time to a different information terminal via a network, and deletes said point contents after said changed survival time has expired, wherein the survival time of said points contents is changed by said information terminal before the points contents are transmitted to said different information terminal.

28. The point system according to claim 27, wherein when changing the survival time of said received point contents by using said survival time extension coefficient, said information terminal gains a point in compensation therefor.

29. A point system comprising an information terminal, an information distribution enterpriser terminal and a point management center, wherein said information distribution enterpriser terminal transmits utilization registration data of the point system to said point management center via a network;

said point management center allows utilization of the point system on the basis of the transmitted utilization registration data;

said information distribution enterpriser terminal transmits point contents containing allowed survival time to said information terminal via a network; and said information terminal receives the point contents and normal contents containing survival time but not allowed for utilization of the point system, wherein the survival time is set before being received by said information terminal, by the transmission side of said points contents, wherein said information terminal changes the survival times of said received point contents and normal contents, transmits said point contents and normal contents containing the survival times to a different information terminal via a network, deletes said point contents and normal contents after said changed survival times have expired, handles the survival time of said point contents preferentially to the survival time of said normal contents, and gains a point in compensation for the preferential handling, wherein the survival time is changed by said information terminal before the points contents and normal contents are transmitted to said different information terminal.

30. An information terminal comprising:

a network interface to receive contents containing survival time and transmit contents containing survival time to a different information terminal via a network;

a recording unit to record contents received by a network interface; and a central processing unit to control the information terminal, wherein the survival time contained in the contents recorded in the recording unit is changed by the central processing unit before the contents is transmitted to a different information terminal from the network interface;

wherein the contents recorded in the recording unit is deleted after the survival time changed central processing unit has expired; and wherein the survival time is set before being received by said network interface, by the transmission side of the contents.

* * * * *